(12) United States Patent
Iourcha et al.

(10) Patent No.: US 7,551,174 B2
(45) Date of Patent: Jun. 23, 2009

(54) METHOD AND APPARATUS FOR TRIANGLE RASTERIZATION WITH CLIPPING AND WIRE-FRAME MODE SUPPORT

(75) Inventors: Konstantine Iourcha, San Jose, CA (US); Boris Prokopenko, Milpitas, CA (US); Timour Paltashev, Fremont, CA (US); Derek Gladding, San Francisco, CA (US)

(73) Assignee: Via Technologies, Inc., Taipei (TW)

( * ) Notice: Subject to any disclaimer, the term of this patent is extended or adjusted under 35 U.S.C. 154(b) by 901 days.

(21) Appl. No.: 10/746,055

(22) Filed: Dec. 23, 2003
(Under 37 CFR 1.47)

(65) Prior Publication Data
US 2005/0134603 A1 Jun. 23, 2005

(51) Int. Cl.
*G06T 15/00* (2006.01)
(52) U.S. Cl. ............... 345/443; 345/441; 345/427; 345/619
(58) Field of Classification Search ......... 345/427, 345/610, 619, 620, 622, 441, 442, 443
See application file for complete search history.

(56) References Cited

U.S. PATENT DOCUMENTS

| | | | |
|---|---|---|---|
| 4,590,465 A | 5/1986 | Fuchs | |
| 4,827,445 A | 5/1989 | Fuchs | |
| 5,355,449 A * | 10/1994 | Lung et al. | 345/467 |
| 5,428,728 A * | 6/1995 | Lung et al. | 345/469 |
| 5,444,839 A | 8/1995 | Silverbrook et al. | |
| 5,446,836 A | 8/1995 | Lentz et al. | |
| 5,493,644 A | 2/1996 | Thayer et al. | |
| 5,517,603 A | 5/1996 | Kelley et al. | |
| 5,519,822 A | 5/1996 | Barkans et al. | 395/143 |
| 5,774,133 A * | 6/1998 | Neave et al. | 345/505 |
| 5,786,826 A | 7/1998 | Kwok | |
| 5,821,944 A | 10/1998 | Watkins | |
| 5,877,779 A | 3/1999 | Goldberg et al. | |
| 5,914,722 A | 6/1999 | Aleksic | |
| 6,016,151 A | 1/2000 | Lin | |
| 6,020,901 A | 2/2000 | Lavelle et al. | |
| 6,222,550 B1 | 4/2001 | Rosman et al. | |
| 6,421,053 B1 | 7/2002 | Johns et al. | |
| 6,473,089 B1 | 10/2002 | Wei et al. | |
| 6,501,474 B1 | 12/2002 | Thomson et al. | |
| 6,504,542 B1 | 1/2003 | Voorhies et al. | |
| 6,518,965 B2 | 2/2003 | Dye et al. | |
| 7,027,056 B2 * | 4/2006 | Koselj et al. | 345/519 |

OTHER PUBLICATIONS

Joel McCormack and Robert McNamara, "Tiled Polygon Traversal Using Half-plane Edge Functions", ACM 2000, pp. 15-22.
McNamara, et al; "Prefiltered Antialiased Lines Using Half-plane Distance Functions", ACM, 2000, pp. 77-86.
Olano, et al; "Triangle Scan Conversion Using 2D Homogeneous Coordinates". Hewlett Package, 2001, pp. 1-7.

* cited by examiner

*Primary Examiner*—Phu K Nguyen
(74) *Attorney, Agent, or Firm*—Thomas, Kayden, Horstemeyer & Risley

(57) ABSTRACT

A low-cost high-speed programmable rasterizer accepting an input set of functionals representing a triangle, clipping planes and a scissoring box, and producing multiple spans per clock cycle as output. A Loader converts the input set from a general form to a special case form accepted by a set of Edge Generators, the restricted input format accepted by the Edge Generators contributing to their efficient hardware implementation.

10 Claims, 16 Drawing Sheets

METHOD AND APPARATUS FOR TRIANGLE RASTERIZATION WITH CLIPPING AND WIRE-FRAME MODE SUPPORT

BACKGROUND

1. Field

Invention relates generally to rasterizers and, more particularly, to accelerating the conversion of primitives defined by vertexes to equivalent images composed of pixel patterns that can be stored and manipulated as sets of bits.

2. Related Art

Raster displays are commonly used in computer graphics systems. These displays store graphics images as a matrix of the smallest picture elements that can be displayed on a screen ("pixels") with data representing each pixel being stored in a display buffer. This data specifies the display attributes for each pixel on the screen such as the intensity and color of the pixel. An entire image is read from the display buffer and displayed on the screen by sequentially scanning out horizontal rows of pixel data or "scan lines."

Raster display systems commonly use polygons as basic building blocks or "primitives" for drawing more complex images. Triangles are a common basic primitive for polygon drawing systems, since a triangle is the simplest polygon and more complex polygons can be represented as sets of triangles. The process of drawing triangles and other geometric primitives on the screen is known as "rasterization."

An important part of rasterization involves determining which pixels fall within a given triangle. Rasterization systems generally step from pixel to pixel in various ways and determine whether or not to "render," i.e. to draw into a frame buffer or pixel map, each pixel as part of the triangle. This, in turn, determines how to set the data in the display buffer representing each pixel. Various traversal algorithms have been developed for moving from pixel to pixel in a way such that all pixels within the triangle are covered.

Rasterization systems sometimes represent a triangle as a set of three edge-functions. An edge function is a line equation representing a straight line, which serves to subdivide a two-dimensional plane. Edge functions classify each point within the plane as falling into one of three regions: the region "inside" of the triangle, the region "outside" of the triangle or the region representing the line itself. The type of edge function that will be discussed has the property that points "inside" of the triangle have a value greater than zero, points "outside" have a value less than zero, and points exactly on the line have a value of zero. This is shown in FIG. 1a. Applied to rasterization systems, the two-dimensional plane is represented by the graphics screen, points are represented by individual pixels, and the edge function serves to subdivide the graphics screen.

The union of three edges, or more particularly three half-planes, each of which is specified by edge functions, create triangles. It is possible to define more complex polygons by using Boolean combinations of more than three edges. Since the rasterization of triangles involves determining which pixels to render, a tiebreaker rule is generally applied to pixels that lie exactly on any of the edges to determine whether the pixels are to be considered interior or exterior to the triangle.

As shown in FIG. 1b, each pixel has associated with it a set of edge variables ($e_0$, $e_1$ and $e_2$) which are proportional to the signed distance between the pixel and the three respective edges. The value of each edge variable is determined for a given triangle by evaluating the three edge functions, $f_0(x,y)$, $f_1(x,y)$ and $f_2(x,y)$ for the pixel location. It is important to note that it can be determined whether or not a pixel falls within a triangle by looking at only the signs of $e_0$, $e_1$ and $e_2$.

In determining which pixels to render within a triangle, typical rasterization systems compute the values of the edge variables ($e_0$, $e_1$ and $e_2$) for a given set of three edge functions and a given pixel position, and then use a set of increment values ($\Delta e_{outside}$, $\Delta e_{inside}$, etc.) to determine the edge variable values for adjacent pixels. The rasterization system traverses the triangle, adding the increment values to the current values as a traversal algorithm steps from pixel to pixel.

With reference again to FIG. 1a, a line is illustrated that is defined by two points: (X,Y) and (X+dX, Y+dY). As noted above, this line can be used to divide the two dimensional space into three regions: all points "outside" of, "inside" of, and exactly on the line. The edge f(x,y) can be defined as $f(x,y)=(x-X)dY-(y-Y)dX$. This function has the useful property that its value is related to the position of the point (x,y) relative to the edge defined by the points (X,Y) and (X+dX, Y+dY):

f(x,y)>0 if (x,y) is "inside";
f(x,y)=0 if (x,y) is exactly on the line; and
f(x,y)<0 if (x,y) is "outside".

Existing rasterization systems commonly use this function, since it can be computed incrementally by simple addition: $f(x+1,y)=f(x,y)+dY$ and $f(x,y+1)=f(x,y)-dX$.

A variety of different traversal algorithms are presently used by different rasterization systems in the rendering process. Any algorithm guaranteed to cover all of the pixels within the triangle can be used. For example, some solutions involve following the sides of the triangle while identifying a horizontal or vertical span of pixels therein. Following the sides of the triangle is adequate for the triangle edges, but if the triangle is clipped by a near or far plane, these boundaries are not known explicitly and cannot be followed as easily as the triangle edges. Other methods test individual pixels one at a time. In the recent past multiple pixels are tested in parallel to speed up the rasterization process.

Some conventional rasterizers use span-based pixel generation and contain edge and span interpolators based on the well-known Bresenham algorithm. The speed of those rasterizers depends on the interpolation speed. Furthermore, they require a complicated setup process. In most cases such rasterizers interpolate many associated parameters such as color, texture, etc. with appropriate hardware. Increasing the speed of such rasterizers requires a significant increase in the number and complexity of the interpolators, an approach not suitable for commercial products. In the case of clipping support, the structure of such rasterizers is too complex for efficient implementation.

Another approach is to use area rasterizers based on a definition of inner and outer pixels, grouped into blocks, with checking corner pixels' equation values to define inner, border and outer blocks. This approach may accelerate the generation of bit-masks of inner blocks, but the border blocks either need to be processed pixel by pixel or need a significant amount of dedicated hardware for processing those pixels in parallel.

Accordingly, there is a need for a low-cost high-speed rasterizer having a simple and uniform structure and capable of generating multiple spans per clock cycle.

SUMMARY

Invention describes a low-cost high-speed programmable rasterizer. The rasterizer accepts as input a set of functionals representing a triangle, clipping planes and a scissoring box, and produces multiple spans per clock cycle as output. A Loader converts the input set, as expressed in one of a number of general forms, to an expression conforming to a special case format as accepted by a set of Edge Generators. The restricted input format accepted by the Edge Generators contributes to their efficient hardware implementation.

DETAILED DESCRIPTION

The following servers as a glossary of terms as defined herein:

Triangle Intersection of three half-planes, wherein each half-plane is "open" or "closed".

Figure 1A:
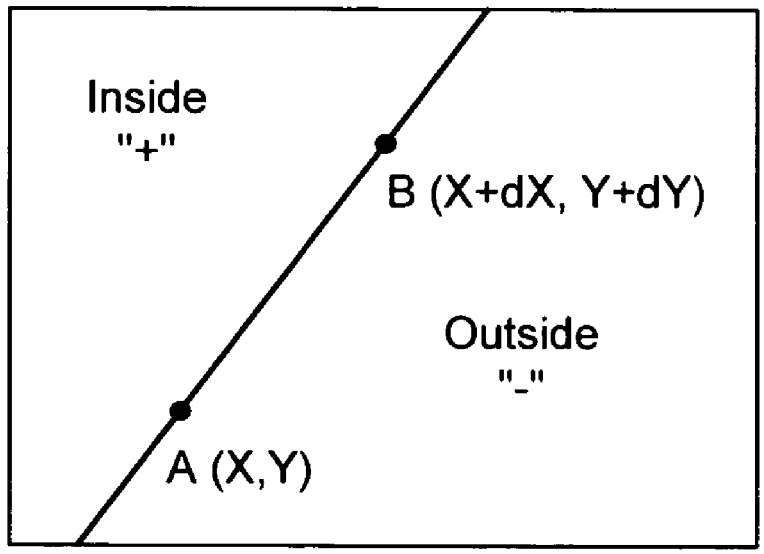
FIG. 1a is a diagram illustrating a half-plane, according to an embodiment of the present invention.
Figure 1B:
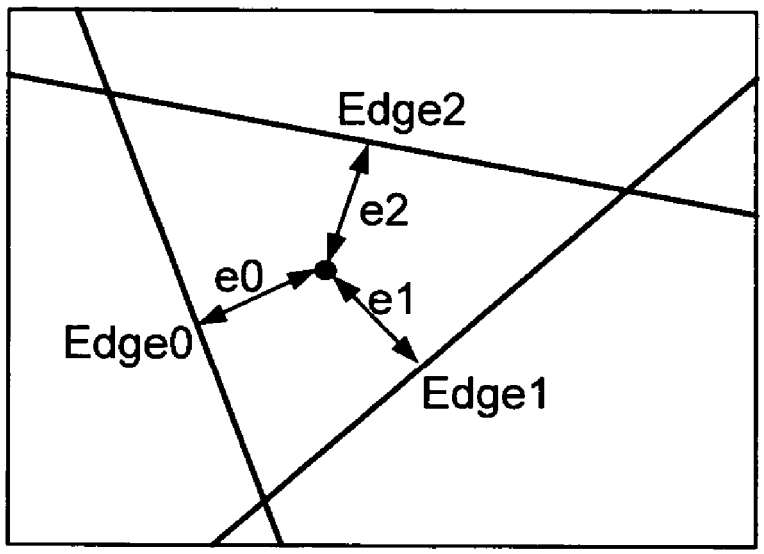
FIG. 1b is a diagram illustrating a triangle defined by three half-planes, according to an embodiment of the present invention.
Figure 1C:
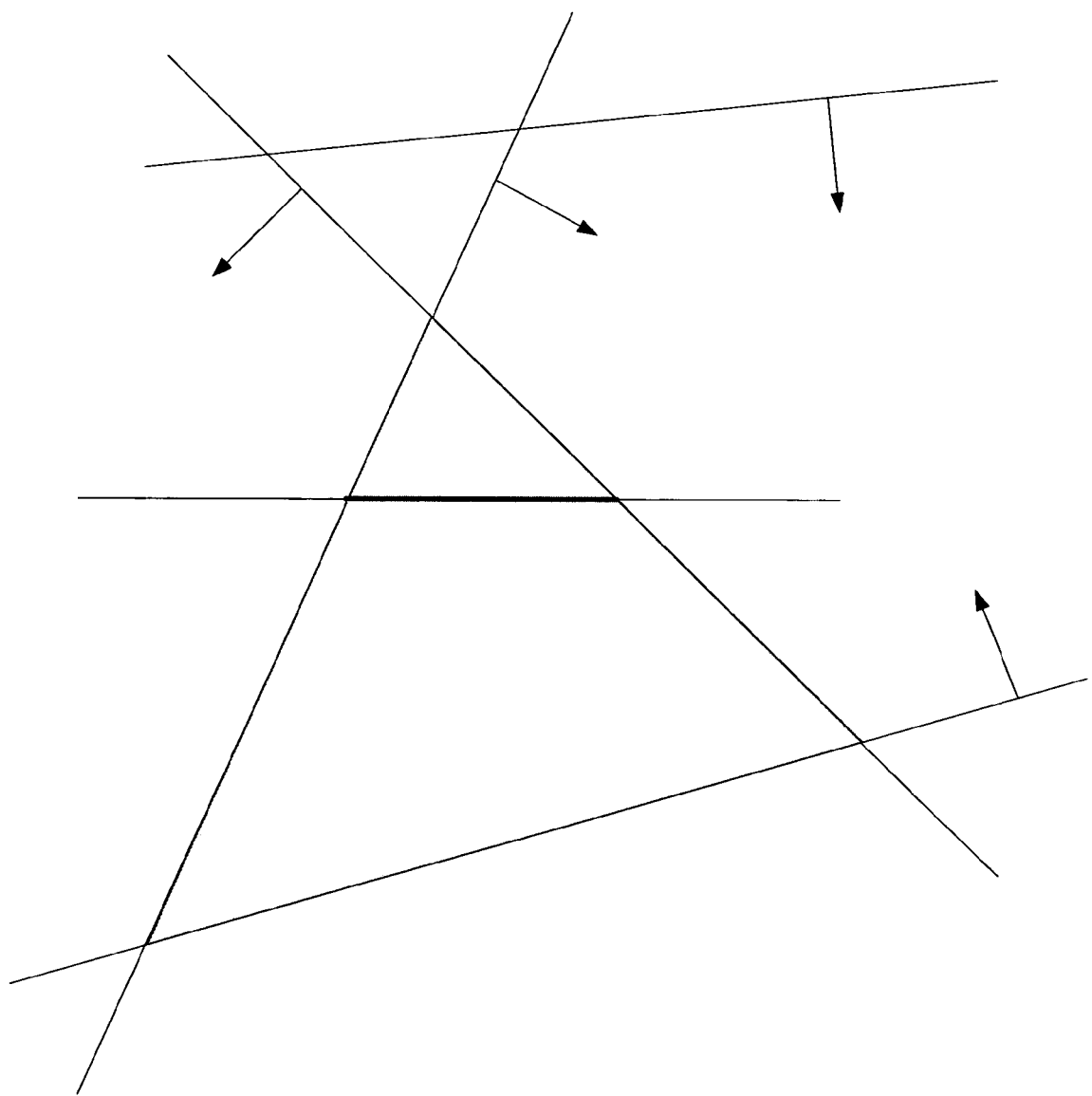
FIG. 1c is a diagram illustrating a polygon defined by a set of half-planes, according to an embodiment of the present invention.

Polygon Intersection of a triangle and the clipping half-planes (shown in FIG. 1c), wherein each clipping half-plane is "open" or "closed".

Figure 1D:
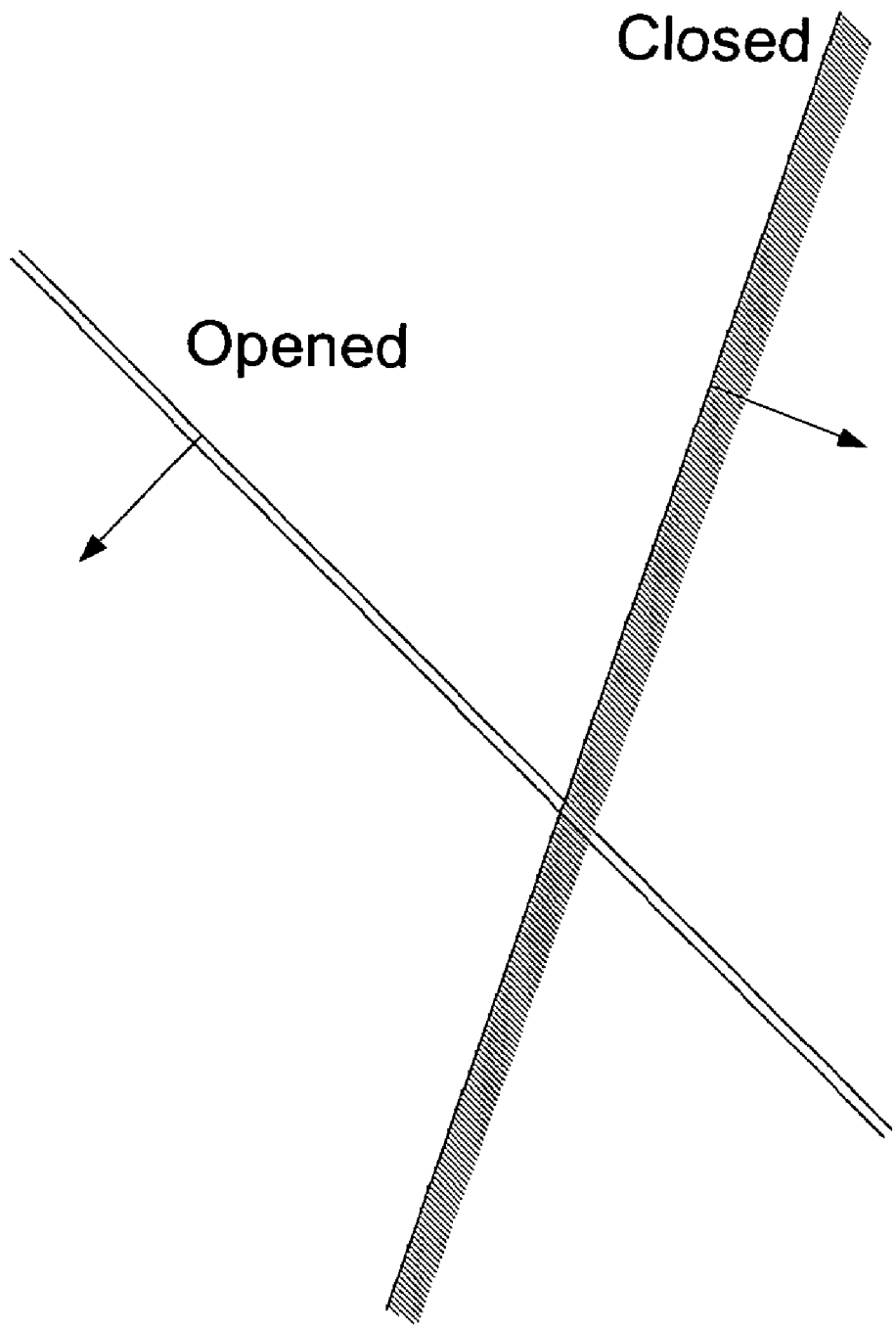
FIG. 1d is a diagram illustrating an opened half-plane and a closed half-plane, according to an embodiment of the present invention.

"Open" half-plane A half-plane which satisfies the inequality (as shown in FIG. 1d)

$$a \cdot x + b \cdot y + c > 0 \qquad (1)$$

"Closed" half-plane A half-plane which satisfies the inequality (as shown in FIG. 1d)

$$a \cdot x + b \cdot y + c \geq 0 \qquad (2)$$

Half-plane functional An expression describing a half-plane or a line $$f(x, y) = a \cdot x + b \cdot y + c \qquad (3)$$

"Right" half-plane A half-plane described by a functional $$f(x, y) = a \cdot x + b \cdot y + c, \text{ where } a<0 \vee a=0 \wedge b<0 \qquad (4)$$

"Left" half-plane A half-plane described by a functional $$f(x, y) = a \cdot x + b \cdot y + c, \text{ where } a>0 \vee a=0 \wedge b>0 \qquad (5)$$

Scissoring box A rectangle representing a part of the viewport where polygon are actually drawn.

Bounding box A smallest rectangle to fit the intersection of a triangle and the scissoring box Extended bounding box A bounding box, which horizontal size is the smallest power of 2, which is greater or equal to the size of the bounding box w The horizontal size of the bounding box $$w = x_{max} - x_{min} \qquad (6)$$

W The horizontal size of the extended bounding box, for which it could be expressed as:

$$W = 2^{ceiling(\log_2 w)} \qquad (7)$$

x Representation of the integer horizontal coordinate inside the bounding box expressed in current grid units y Representation of the integer vertical coordinate inside the bounding box expressed in current grid units $x_{min}$ Representation of the minimal horizontal coordinate of the bounding box $y_{min}$ Representation of the minimal vertical coordinate of the bounding box a, b, c Integer coefficients of the functional of the half-plane $\tilde{a}, \tilde{b}, \tilde{c}$ Integer coefficients of the functional transformed to the bounding box relative coordinates according to the special case of the edge functional "Edge" of a "left" half-plane The set of points $(x_i, y_i)$ satisfying the expression $$x_i = \min_{x \in Z}\{x : a \cdot x + b \cdot y_i + c \geq 0\} \qquad (8)$$

where $a > 0$ and $i = 0, 1, \ldots, y_{max} - y_{min}$, or $$y_i = \min_{y \in Z}\{y : a \cdot x_i + b \cdot y + c \geq 0\} \qquad (9)$$

where $a = 0$ and $b > 0$ and $i = 0, 1, \ldots, x_{max} - x_{min}$

"Left" edge "Edge" of a "left" half-plane

"Edge" of a "right" half-plane The set of points $(x_i, y_i)$ satisfying the expression $$x_i = \max_{x \in Z}\{x : a \cdot x + b \cdot y_i + c > 0\} \qquad (10)$$

where $a < 0$ and $i = 0, 1, \ldots, y_{max} - y_{min}$, or $$y_i = \max_{y \in Z}\{y : a \cdot x_i + b \cdot y + c > 0\} \qquad (11)$$

where $a = 0$ and $b < 0$ and $i = 0, 1, \ldots, x_{max} - x_{min}$

"Right" edge "Edge" of a "right" half-plane

"Edge" of a half-plane If the half-plane is a "right" half-plane, then the "edge" of the "right" half-plane, otherwise the "edge" of the "left" half-plane "Edge" of a polygon "Edge" of one of the half-planes forming the polygon Wire-frame A disjunction of three parallelograms based on the three edges of the triangle "Width" of a wire-frame Integer number, which expresses in the current grid units projection of the width of the wire-frame line to a minor direction axis of the current grid.

d The width of the wire-frame line

Edge Generator EG State machine to generate an edge of a half-plane, which computes a sequence of x coordinate values in order of incrementing y coordinate associated with one of the functionals Loader Pipelined device to transform input functionals to the form, which is convenient for EG to work Sorter Pipelined device to compute the intersection of half-planes, edges of which are generated by several EG Span buffer Temporary storage for spans before tiling Tiling Process of making tiles Tile Set of 8×8 pixels, aligned by x and y coordinates Tile Generator TG State machine to produce tiles from spans in Span Buffer Moving Down Phase of the EG when EG is adding $\tilde{b}$ value to the functional value each clock until the functional value is positive SHORT Data type to define signed 22-bit numbers LONG Data type to define signed 42-bit numbers BITN Data type to define unsigned N-bit numbers BITNS Data type to define signed N-bit numbers Triangle Edge Definition We assume that triangle edge functions are defined as $$F_i(x, y) = a_i \cdot x + b_i \cdot y + c_i = \det \begin{pmatrix} x_j & x_k & x \\ y_j & y_k & y \\ 1 & 1 & 1 \end{pmatrix}, i = 0, 1, 2 \quad (12)$$

wherein j=(i+1) mod 3, k=(i+2) mod 3 and [$x_i$, $y_i$], i=0, 1, 2 are triangle vertex coordinates in a standard window coordinate system expressed in the units of the main grid (see above). If the functionals are set up as "implicit" clipping functionals, they should be converted to this format as well.

End Points

For a right edge and a given span $y_i$ the interpolator should produce $x_i$ such that $$x_i = \max_{x \in Z} \{x : a \cdot x + b \cdot y_i + c > 0\} \quad (13)$$

such an $x_i$ point for a≠0 is the last (inclusive) point of the span.

For a left edge and a given span $y_i$ the interpolator should produce $x_i$ such that $$x_i = \min_{x \in Z} \{x : a \cdot x + b \cdot y_i + c \geq 0\} \quad (14)$$

such an $x_i$ point for a≠0 is the first (inclusive) point of the span.

If we have a=0 then the edge (left or right) is horizontal, thus the end points of the span for the functional will be $x_0$=0 and $x_0$=W.

General Cases for the Edge Generator

Figure 2:
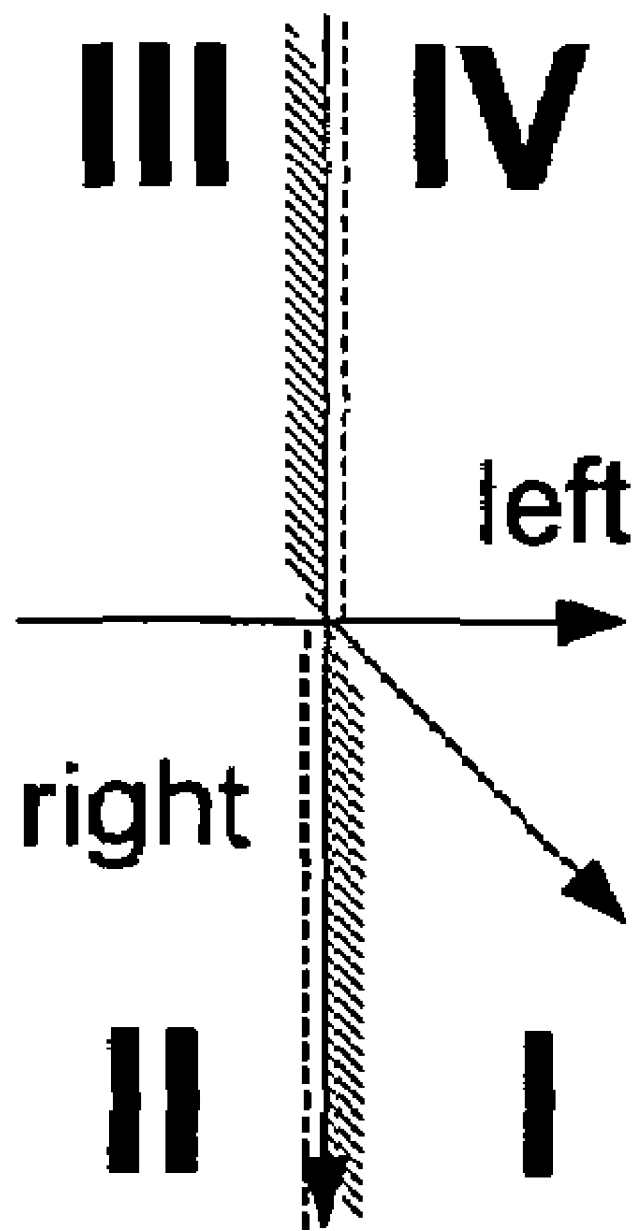
FIG. 2 is a diagram illustrating normals in quadrants and the definition of "right" and "left" half-planes, according to an embodiment of the present invention.

In general case we have opened right half-planes and closed left half-planes, classified as follows, also shown in FIG. 2:

| Case # | Half-plane | Normal quadrant | A | B |
| --- | --- | --- | --- | --- |
| 1 | Right open | II | <0 | ≧0 |
| 2 | Right open | III | <0 | <0 |
| 3 | Right open | III | =0 | <0 |
| 4 | Left closed | IV | >0 | ≦0 |
| 5 | Left closed | I | >0 | >0 |
| 6 | Left closed | I | =0 | >0 |
| 7 | Whole bounding box is inside or outside the plane | n/a | =0 | =0 |

A Loader 102 transforms a functional given according to a general case into a functional given by the special case, with the special case and the general cases described as follows:

Special Case for the Edge Generator

The Edge Generator 103 (shown in FIG. 7) operates within a discrete space with integer coefficients. To simplify the work of the Edge Generator 103, the Edge Generator 103 is designed to draw an edge of a closed right half-plane (i.e. a right edge), whose normal is located in quadrant II since we have a<0 and b≧0. For an edge with a<0 we have:

$$f(x, y) = a \cdot x + b \cdot y + c = 0 \Rightarrow x = -\frac{b}{a} \cdot y - \frac{c}{a} \quad (15)$$

from which we calculate $$x_0 = \text{floor}\left(-\frac{c}{a}\right) \quad (16)$$

$$\Delta x = \text{floor}\left(-\frac{b}{a}\right)$$

The Edge Generator 103 works in a vertical stripe [$x_{min}$, $x_{max}$] using an x coordinate relative to $x_{min}$ which satisfies 0≦x≦W, wherein W=$2^m$ is the size of the extended bounding box. As described below, the setup division starts as soon as the functional changes sign from negative to positive and f(0, y)≧0, hence resulting in $x_0$≧0. Also, $\Delta x$≧0 according to the above assumption that a<0 and b≧0.

It is possible that the value of the functional $f$ is negative when the Edge Generator 103 starts operating (i.e. when y=0). In this case, the $x_0$ value could be negative and hence does not need to be computed, since we are only interested in the exact $x_0$ values which satisfy 0≦$x_0$≦W.

The completion of the moving-down process is followed by calculating $x_0$=floor(-c/a) and $\Delta x$=floor(-b/a) using a division process performed by the divider. Since the divider starts operating when the functional value changes its sign from negative to positive, we can assume that at the start of the division process $f$(0, y)≧0. To calculate $x_0$ and $\Delta x$ the divider operates under the assumption that $$a<0, b\geq 0 \quad (17)$$

and uses a simple adder-based divider. Since a<0, we take $$c_i - (-a_i) \equiv c_i + a_i$$
$$b_i - (-a_i) \equiv b_i + a_i \qquad (18)$$

into consideration start with $$c_0 = f(x,y), a_0 = \tilde{a} \cdot 2^{m+1}, b_0 = \tilde{b}, x_{00} = \Delta x_0 = 0 \qquad (19)$$

and then iterate as follows:

$$c_{i+1} = c_i + \begin{cases} a_i, & c_i + a_i \geq 0 \\ 0, & c_i + a_i < 0 \end{cases} \qquad (20)$$

$$x_{0i+1} = x_{0i} \cdot 2 + \begin{cases} 1, & c_i + a_i \geq 0 \\ 0, & c_i + a_i < 0 \end{cases}$$

$$b_{i+1} = b_i + \begin{cases} a_i, & b_i + a_i \geq 0 \\ 0, & b_i + a_i < 0 \end{cases}, i = 0, 1, \ldots, m$$

$$\Delta x_{i+1} = \Delta x_i \cdot 2 + \begin{cases} 1, & b_i + a_i \geq 0 \\ 0, & b_i + a_i < 0 \end{cases}$$

$$a_{i+1} = \frac{a_i}{2}$$

describing the fully functional step-by-step integer divider.

Case 1: Right Open Half-plane and A<0∧B≧0

The difference between this case and the special case is only that the half-plane is open.

Therefore we need to find $$x_0 = \max_{x \in Z}\{x : a \cdot x + b \cdot y + c > 0\} \qquad (21)$$

Since the coefficients and variables are integer, $$x_0 = \max_{x \in Z}\{x : a \cdot x + b \cdot y + c - 1 \geq 0\} \qquad (22)$$

and therefore $$x_0 = \max_{x \in Z}\{x : a \cdot x + b \cdot y + \tilde{c} \geq 0\}, \tilde{c} = c - 1 \qquad (23)$$

which reduces this case to the special case. Thus, in this case the Loader 102 (shown in FIG. 7) subtracts 1 from c before starting the Edge Generator 103.

Case 2: Right Open Half-plane and A<0∧B<0

Again we need to find $$x_0 = \max_{x \in Z}\{x : a \cdot x + b \cdot y + c > 0\} \qquad (24)$$

Substituting x=W−x̃ we have $$x_0 = W - \min_{\tilde{x} \in Z}\{\tilde{x} : -a \cdot \tilde{x} + b \cdot y + c + W \cdot a > 0\} \qquad (25)$$

and computing maximum in the complimentary semi-plane $$x_0 = W - \max_{\tilde{x} \in Z}\{\tilde{x} : -a \cdot \tilde{x} + b \cdot y + c + W \cdot a \leq 0\} - 1 \qquad (26)$$

and rewriting the constraint and collecting appropriate terms we have $$x_0 = W - 1 - \max_{\tilde{x} \in Z}\{\tilde{x} : a \cdot \tilde{x} - b \cdot y - c - W \cdot a \geq 0\} \qquad (27)$$

and finally $$x_0 = W - 1 - \max_{\tilde{x} \in Z}\{\tilde{x} : \tilde{a} \cdot \tilde{x} + \tilde{b} \cdot y + \tilde{c} \geq 0\} \qquad (28)$$

where $$\tilde{a} = a, \tilde{b} = -b, \tilde{c} = -c - W \cdot a \qquad (29)$$

which reduces this case to the special case.

Case 3: Right Open Half-plane and A=0∧B<0

Whereas in the previous case for a<0∧b<0 we had $$x_0 = W - 1 - \max_{\tilde{x} \in Z}\{\tilde{x} : \tilde{a} \cdot \tilde{x} + \tilde{b} \cdot y + \tilde{c} \geq 0\} \qquad (30)$$

wherein $$\tilde{a} = a, \tilde{b} = -b, \tilde{c} = -c - W \cdot a \qquad (31)$$

In this case we have a=0, which means that (30) does not have a maximum. However the division algorithm described above (16) is stable in the case of a zero denominator, producing in this case $$\tilde{x}_0 = 2 \cdot W - 1 \Rightarrow x_0 = W - 1 - \tilde{x}_0 = -W \qquad (32)$$

after the completion of the division algorithm, indicating that the x value reaches the other edge of the bounding box and that the Edge Generator 103 will draw a horizontal line.

Case 4: Left Closed Half-plane and A>0∧B≦0

Again we want to find $$x_0 = \min_{x \in Z}\{x : a \cdot x + b \cdot y + c \geq 0\} \qquad (33)$$

or equivalently $$x_0 = \min_{x \in Z}\{x: -a \cdot x - b \cdot y - c \le 0\} \quad (34)$$

Substituting $a=-\tilde{a}$, $b=-\tilde{b}$ and computing the maximum in the complimentary semi-plane, we have $$x_0 = \max_{x \in Z}\{x: \tilde{a} \cdot x + \tilde{b} \cdot y - c > 0\} + 1 \quad (35)$$

Since the coefficients and variables are integer, we have $$x_0 = \max_{x \in Z}\{x: \tilde{a} \cdot x + \tilde{b} \cdot y - c - 1 \ge 0\} + 1 \quad (36)$$

and therefore $$x_0 = \max_{x \in Z}\{x: \tilde{a} \cdot x + \tilde{b} \cdot y + \tilde{c} \ge 0\} + 1 \quad (37)$$

wherein $$\tilde{a}=-a, \tilde{b}=-b, \tilde{c}=-c-1 \quad (38)$$

reducing to the special case.

Case 5: Left Closed Half-plane and A>0∧B>0

We want to find $$x_0 = \min_{x \in Z}\{x: a \cdot x + b \cdot y + c \ge 0\} \quad (39)$$

Substituting $x=W-\tilde{x}$ we have $$x_0 = W - \max_{\tilde{x} \in Z}\{\tilde{x}: -a \cdot \tilde{x} + b \cdot y + c + W \cdot a \ge 0\} \quad (40)$$

and therefore $$x_0 = W - \max_{\tilde{x} \in Z}\{\tilde{x}: \tilde{a} \cdot \tilde{x} + \tilde{b} \cdot y + \tilde{c} \ge 0\} \quad (41)$$

wherein $$\tilde{a}=-a, \tilde{b}=b, \tilde{c}=c+W \cdot a \quad (42)$$

reducing to the special case.

Case 6: Left Closed Half-plane and A=0∧B>0

In the previous case for a>0∧b>0 we had $$x_0 = W - \max_{\tilde{x} \in Z}\{\tilde{x}: \tilde{a} \cdot \tilde{x} + \tilde{b} \cdot y + \tilde{c} \ge 0\} \quad (43)$$

wherein $$\tilde{a}=-a, \tilde{b}=b, \tilde{a}=c+W \cdot a \quad (44)$$

In this case we have a=0 resulting in (43) having no maximum. However, the division algorithm described above (16) is again stable in this case of zero denominator, resulting in $$\tilde{x}_0 = 2 \cdot W - 1 \Rightarrow x_0 = W - 1 - \tilde{x}_0 = 0 \quad (45)$$

after the division algorithm completes, indicating that the x value reaches the other edge of the bounding box and that the Edge Generator 103 will draw a horizontal line.

Case 7: The Plane of the Polygon is Parallel to the Clipping Plane and A=0∧B=0

This case indicates that the plane of the polygon is parallel to one of the clipping planes. In this case the sign of c determines whether the plane of the polygon is visible or not. If c<0, then the entire bounding box is invisible. The Edge Generator 103 will function normally, but all spans will be marked as being "outside the bounding box". Otherwise, all spans will be marked as being "inside the bounding box".

Wire-Frame Support

Figure 3:
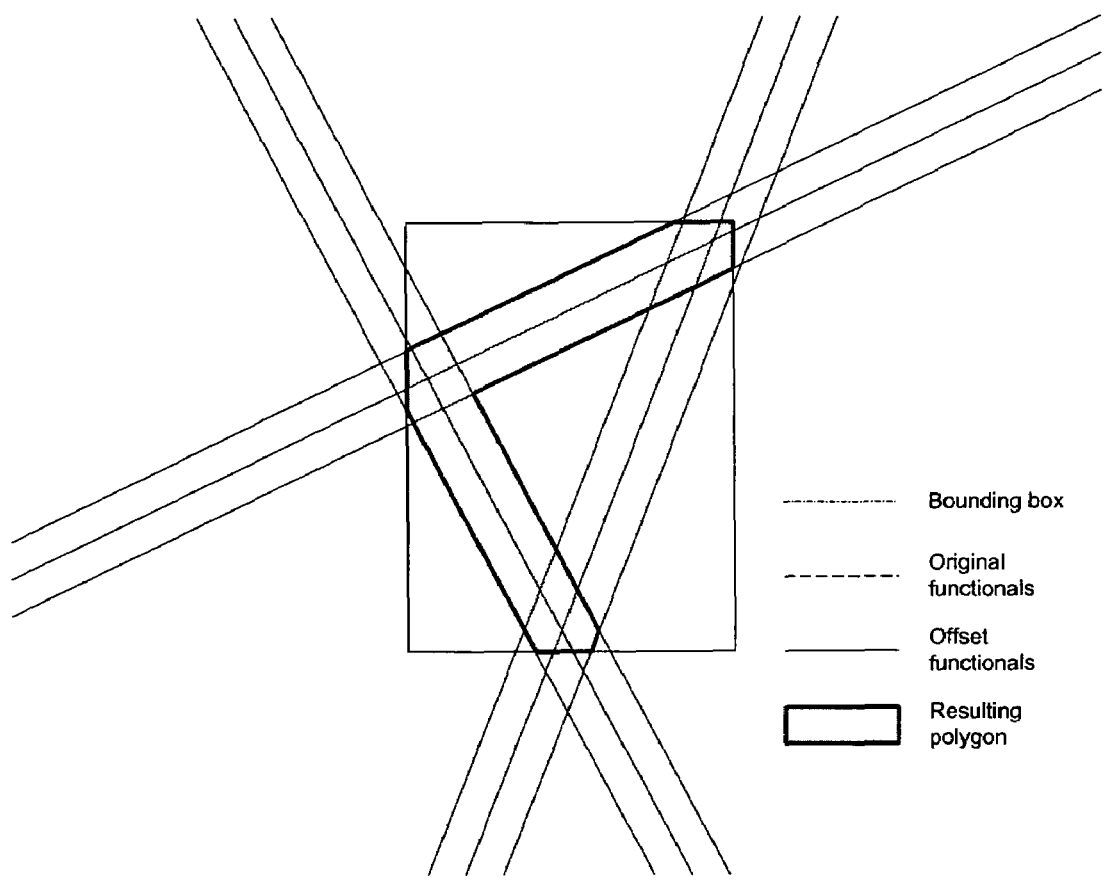
FIG. 3 is a diagram illustrating a wire-frame triangle, according to an embodiment of the present invention.

The next two cases involve wire-frame support. FIG. 3 is a diagram illustrating a wire-frame of a triangle, according to one embodiment of the present invention. The wire-frame of a triangle is a disjunction of three parallelograms, each of which represents an edge of the triangle. We assume that a wire-frame to be drawn comprises a one-pixel line width. The wire-frame support reliably works in the following conditions: (a) no over-sampling (i.e. the current grid is the same as the pixel grid), and (b) the width of the wire-frame is one unit of the current grid (i.e. one pixel according to the foregoing assumption). If the wire-frame support works for any other mode (either over-sampling is on or the width is more than one) we consider the availability of those modes a bonus, which we suppose to get almost for free.

We restrict the wire-frame mode as not comprising any clipping functionals besides a frustum. This means that a wire-framed triangle comprises (a) three functionals representing the triangle edges and (b) the bounding box.

A wire-framed triangle comprises three parameters for drawing:

Width The width of an edge, expressed as the number of pixels to be covered by a triangle edge in the minor direction. A Span Generator 101 (shown in FIG. 7) correctly processes a wire-frame with a one-pixel width.

Edge flag Draw-edge flag (one bit per edge). Each edge of the triangle is equipped with a draw-edge flag, indicating whether the edge is to be drawn.

Extension Bounding box extension. If the draw-edge flag is set for an edge, the bounding box is extended by half of the wire-frame line width.

The wire-frame is an intersection of the "tight" bounding box and an exclusive intersection of two closed-edges triangles. Since the original functionals specify the center-line of each edge of the wire-framed triangle, the functionals for the wireframe are offset by half of the wire-frame width in the "minor" direction, i.e. in the direction of that coordinate whose coefficient in the functional has a smaller absolute value:

Case 8: Right Closed Half-plane for Wire-frame and $A<0 \land B \geq 0$

There is no difference between this case and the special case, so we need to make no corrections for this case $$x_0 = \max_{x \in Z}\{x : a \cdot x + b \cdot y + c \geq 0\} \qquad (46)$$

Case 9: Right Closed Half-plane for Wire-frame and $A \leq 0 \land B < 0$

Again we need to find $$x_0 = \max_{x \in Z}\{x : a \cdot x + b \cdot y + c \geq 0\} \qquad (47)$$

Substituting $x = W - \tilde{x}$ $$x_0 = W - \min_{\tilde{x} \in Z}\{\tilde{x} : -a \cdot \tilde{x} + b \cdot y + c + W \cdot a \geq 0\} \qquad (48)$$

and computing maximum in the complimentary semi-plane $$x_0 = W - \max_{\tilde{x} \in Z}\{\tilde{x} : -a \cdot \tilde{x} + b \cdot y + c + W \cdot a < 0\} - 1 \qquad (49)$$

and rewriting the constraint and collecting appropriate terms we results in $$x_0 = W - 1 - \max_{\tilde{x} \in Z}\{\tilde{x} : a \cdot \tilde{x} - b \cdot y - c - W \cdot a > 0\} \qquad (50)$$

and finally $$x_0 = W - 1 - \max_{\tilde{x} \in Z}\{\tilde{x} : \tilde{a} \cdot \tilde{x} + \tilde{b} \cdot y + \tilde{c} \geq 0\} \qquad (51)$$

wherein $$\tilde{a} = a, \ \tilde{b} = -b, \ \tilde{c} = -c - W \cdot a - 1 \qquad (52)$$

reducing once again to the special case.

The Loader

The Edge Generator 103 works under the assumption of the special case described above, allowing significant reduction of its hardware and resulting in faster operation. The Loader 102 is the element which transforms a general case to the special case, converting an input functional described by a general case into a form expected by the special case, thereby allowing the Edge Generator 103 to compute edge values correctly and efficiently.

The Loader 102 accepts as inputs a functional and a bounding box offset, and produces a set of coefficients a, b, and c according to the special case for the Edge Generator 103.

We have:

$$F(x, y) = a \cdot x' + b \cdot y' + c'$$

$$X \in [x_{min}, x_{max}], [y_{min}, y_{max}] \qquad (53)$$

Since the functional coefficients are expressed in the main grid and the x, y coordinates are expressed in the over-sampling grid, we have a grid ratio of $s = 2^{6+[0, 1, 2]}$ and will convert the c' value to the over-sampling grid. The particular conversion depends on the type of the half-plane at hand. For a closed half-plane the conversion is as follows:

$$f(x, y) = a \cdot x' + b \cdot y' + c' \geq 0 \Rightarrow \qquad (54)$$

$$a \cdot s \cdot x + b \cdot s \cdot y + c' \geq 0, \ x' = s \cdot x, \ y' = s \cdot y \Rightarrow$$

$$a \cdot x + b \cdot y + \frac{c'}{s} \geq 0 \Rightarrow$$

$$a \cdot x + b \cdot y + c \geq 0, \ c = \text{floor}\left(\frac{c'}{s}\right)$$

For an opened half-plane the conversion is as follows:

$$f(x, y) = a \cdot x' + b \cdot y' + c' > 0 \Rightarrow \qquad (55)$$

$$a \cdot s \cdot x + b \cdot s \cdot y + c' > 0, \ x' = s \cdot x, \ y' = s \cdot y \Rightarrow$$

$$a \cdot x + b \cdot y + \frac{c'}{s} > 0 \Rightarrow$$

$$a \cdot x + b \cdot y + c > 0, \ c = \text{ceiling}\left(\frac{c'}{s}\right)$$

It is an advantageous aspect of the present invention that two or more Edge Generators 103 may participate in span generation for the same functional. In one embodiment of the present invention, wherein k=1 (respectively 2 or 4) Edge Generators 103 participate in the span generation for the same functional, we want the first span of the 2 (respectively 4 or 8) spans generated per clock cycle to be aligned by y coordinate by 2 (respectively 4 or 8) accordingly. To accomplish this, denote $$\tilde{y}_{min} = \text{floor}\left(\frac{y_{min}}{k \cdot 2}\right) \cdot k \cdot 2,$$

and substitute $\tilde{x} = x - x_{min}$, $\tilde{y} = y - y_{min}$, $\tilde{c} = c - a \cdot x_{min} - b \cdot \tilde{y}_{min}$ to obtain $$f(\tilde{x}, \tilde{y}) = a \cdot \tilde{x} + b \cdot \tilde{y} + \tilde{c} \qquad (56)$$

The size of the bounding box is $(x_{max} - x_{min}) \cdot (y_{max} - y_{min})$. Here we take $$m = \text{ceiling}(\log_2(x_{max} - x_{min})) \qquad (57)$$

$$W = 2^m \qquad (58)$$

Observing the above cases, taking (23), (52), (38) and (42) in consideration and uniting common expressions results in $$\tilde{a} = -|a| \tag{59}$$

$$\tilde{b} = -|b| \tag{60}$$

$$\tilde{c} = \begin{cases} \tilde{c} - 1, & a < 0 \land b \geq 0 \\ -\tilde{c} - a \cdot W, & a \leq 0 \land b < 0 \\ -\tilde{c} - 1, & a > 0 \land b \leq 0 \\ \tilde{c} + a \cdot W, & a \geq 0 \land b > 0 \end{cases} \tag{61}$$

The number of c values generated according to the foregoing description corresponds to the number of spans that are to be generated per clock cycle, wherein an Edge Generator 103 generates two spans per clock cycle. Each Edge Generator's 103 spans are to be aligned by y such that the first span is even (i.e. $y_{min}$ mod $2=0$) and the second is odd (i.e. $y_{min}$ mod $2=1$). If the $y_{min}$ of the bounding box is odd, span generation starts from $y_{min}-1$. To accomplish that, denote $$c_0^0 = \tilde{c} - \tilde{b} \cdot (y_{min} \bmod 2)$$

$$c_1^0 = c_0^0 + \tilde{b}$$

$$\tilde{b} = 2 \cdot \tilde{b} \tag{62}$$

In the case of more than one Edge Generator 103 participating in span generation for the functional, we need to have more than one set of initial values for the spans. Assuming the number of Edge Generators 103 is k (wherein k=1, 2 or 4), the set of initial values is given by $$c_j^i = c_j^0 + 2 \cdot \tilde{b} \cdot i, \; i=1, \ldots, k, j=0, 1$$

$$\tilde{b} = k \cdot \tilde{b} \tag{63}$$

and the Edge Generators 103 participating in the span generation for the given functional are loaded with the initial values of $c_j^i$, $\tilde{b}$ and $\tilde{a}$.

Moving Down

Before the Bresenham traversal, an Edge Generator 103 performs two operations: moving-down and Bresenham setup. The initial values are $$f(\tilde{x}, \tilde{y}) = \tilde{a} \cdot \tilde{x} + \tilde{b} \cdot \tilde{y} + \tilde{c}, \; \tilde{x}=0, \tilde{y}=0 \tag{64}$$

with the goal of computing for each given $\tilde{y}$ $$\tilde{x}_0 = \text{floor}\left(-\frac{\tilde{b} \cdot \tilde{y} + \tilde{c}}{\tilde{a}}\right), \; \tilde{c} \geq 0 \tag{65}$$

Additionally, an Edge Generator 103 generates an $\tilde{x}$ inside the bounding box. Therefore, if $x_0$ is outside the bounding box, $x_0$ is substituted by 0 or W such that $$\tilde{x} = \begin{cases} 0, & \tilde{x}_0 < 0 \\ \tilde{x}_0, & \tilde{x}_0 \in [0, W] \\ W, & \tilde{x}_0 > W \end{cases} \tag{66}$$

After converting to a special case within the bounding box, we have $f(\tilde{x}, \tilde{y})<0$ for the points above the edge (represented by the functional) and $f(\tilde{x}, \tilde{y}) \geq 0$ on or below the edge, wherein "above" refers to smaller y coordinates and "below" refers to greater y coordinates. We also have $b \geq 0$ and $a<0$ as given by the special case conditions.

Figure 4:
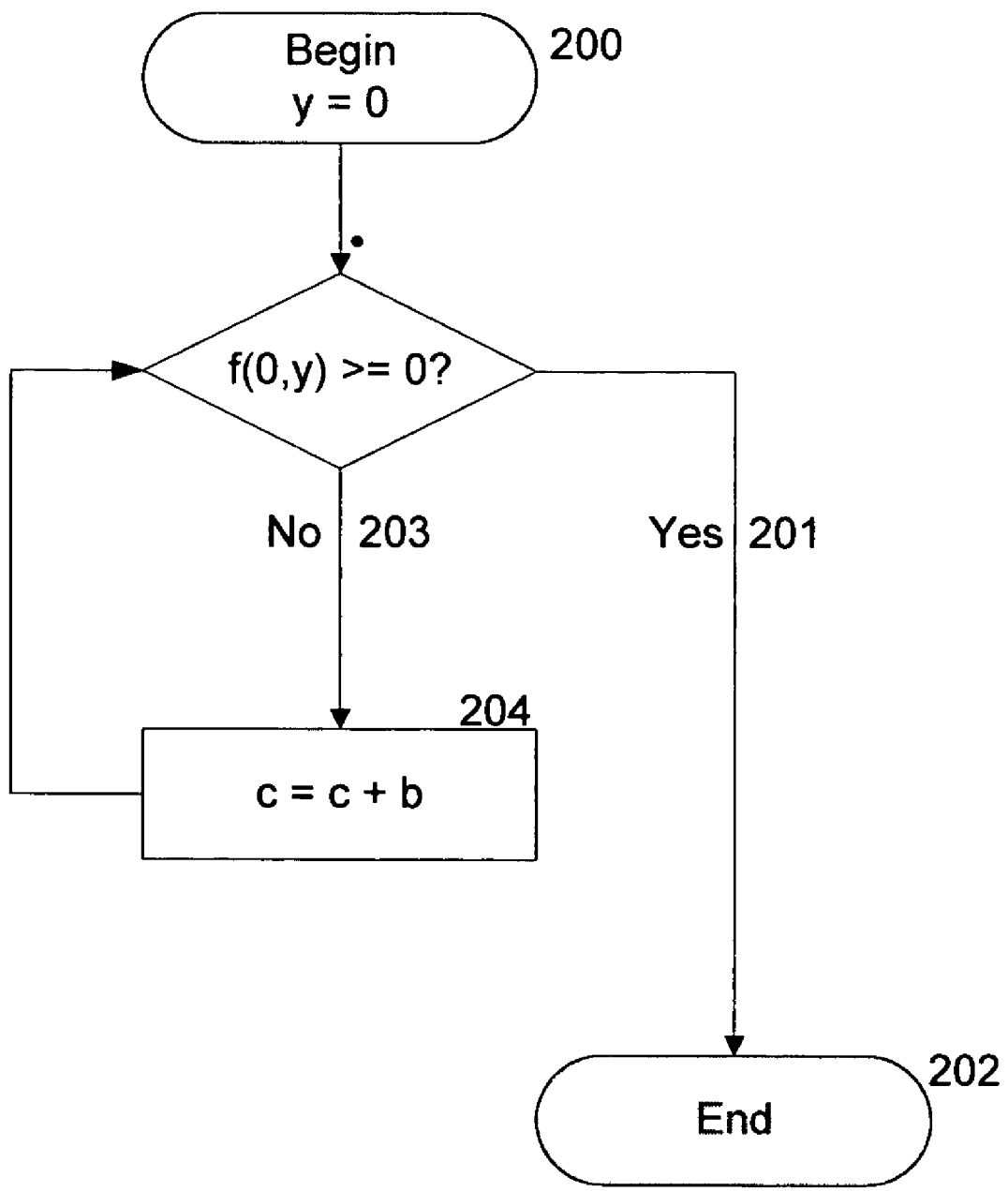
FIG. 4 is a flow diagram illustrating a method for the moving-down process in preparation the Bresenham setup, according to an embodiment of the present invention.

FIG. 4 is a flow diagram illustrating a method for the moving-down process in preparation the Bresenham setup, according to an embodiment of the present invention. The moving-down process starts 200 with $\tilde{y}_k=0$. If 201 the functional value $f(0, \tilde{y}_k) \geq 0$ the moving-down process is complete 202. Otherwise 203, move down along the $\tilde{x}=0$ border of the bounding box by adding 204 $\tilde{b}$ to the functional value at the rate of one increment per clock cycle (wherein $\tilde{b} \geq 0$ and a $\tilde{b}$ increment of the functional value corresponds to incrementing y by 1 until $f(0, \tilde{y}_k) \geq 0$ 201 (wherein k>i), at which point the moving-down process is 202 complete. The moving-down process is represented by the following iterative description:

$$\tilde{y}_0 = 0$$

$$f_0 = f(0, 0) = \tilde{a} \cdot 0 + \tilde{b} \cdot 0 + \tilde{c} = \tilde{c}$$

$$f_i = f(0, i) = \tilde{b} \cdot i + f_0 = \tilde{b} \cdot (i-1) + \tilde{b} + f_0 = f_{i-1} + \tilde{b} \tag{67}$$

Bresenham Setup

The moving-down process is followed by the Bresenham setup process. The purpose of the Bresenham setup is to find the two values $$x_0 = \max_{\tilde{x} \in Z} \{\tilde{x} : \tilde{a} \cdot \tilde{x} + \tilde{b} \cdot \tilde{y}_k + \tilde{c} \geq 0\} \tag{68}$$

and $$\Delta x = \text{floor}\left(-\frac{\tilde{b}}{\tilde{a}}\right) \tag{69}$$

Furthermore, since $$\tilde{b} \cdot \tilde{y}_k + \tilde{c} = f(0, \tilde{y}_k) \tag{70}$$

we obtain $$x_0 = \text{floor}\left(\frac{f(0, \tilde{y}_k)}{-\tilde{a}}\right) \tag{71}$$

The division algorithm described above (see Special Case) is modified as follows for more efficient hardware implementation:

$$c_0 = f(0, \tilde{y}_k), a_0 = \tilde{a} \cdot 2^{m+1}, b_0 = \tilde{b}, x_{00} = \Delta x_0 = 0 \tag{72}$$

with the following steps describing the iterations:

$$\begin{aligned} c_{i+1} &= 2 \cdot \begin{cases} c_i + a_0, & c_i + a_0 \geq 0 \\ c_i, & c_i + a_0 < 0 \end{cases} \\ x_{0i+1} &= 2 \cdot x_{0i} + \begin{cases} 1, & c_i + a_0 \geq 0 \\ 0, & c_i + a_0 < 0 \end{cases} \\ b_{i+1} &= 2 \cdot \begin{cases} b_i + a_0, & b_i + a_0 \geq 0 \\ b_i, & b_i + a_0 < 0 \end{cases} \\ \Delta x_{i+1} &= 2 \cdot \Delta x_i + \begin{cases} 1, & b_i + a_0 \geq 0 \\ 0, & b_i + a_0 < 0 \end{cases} \end{aligned}, \; i=1, 2, \ldots, m+1 \tag{73}$$

Figure 5:
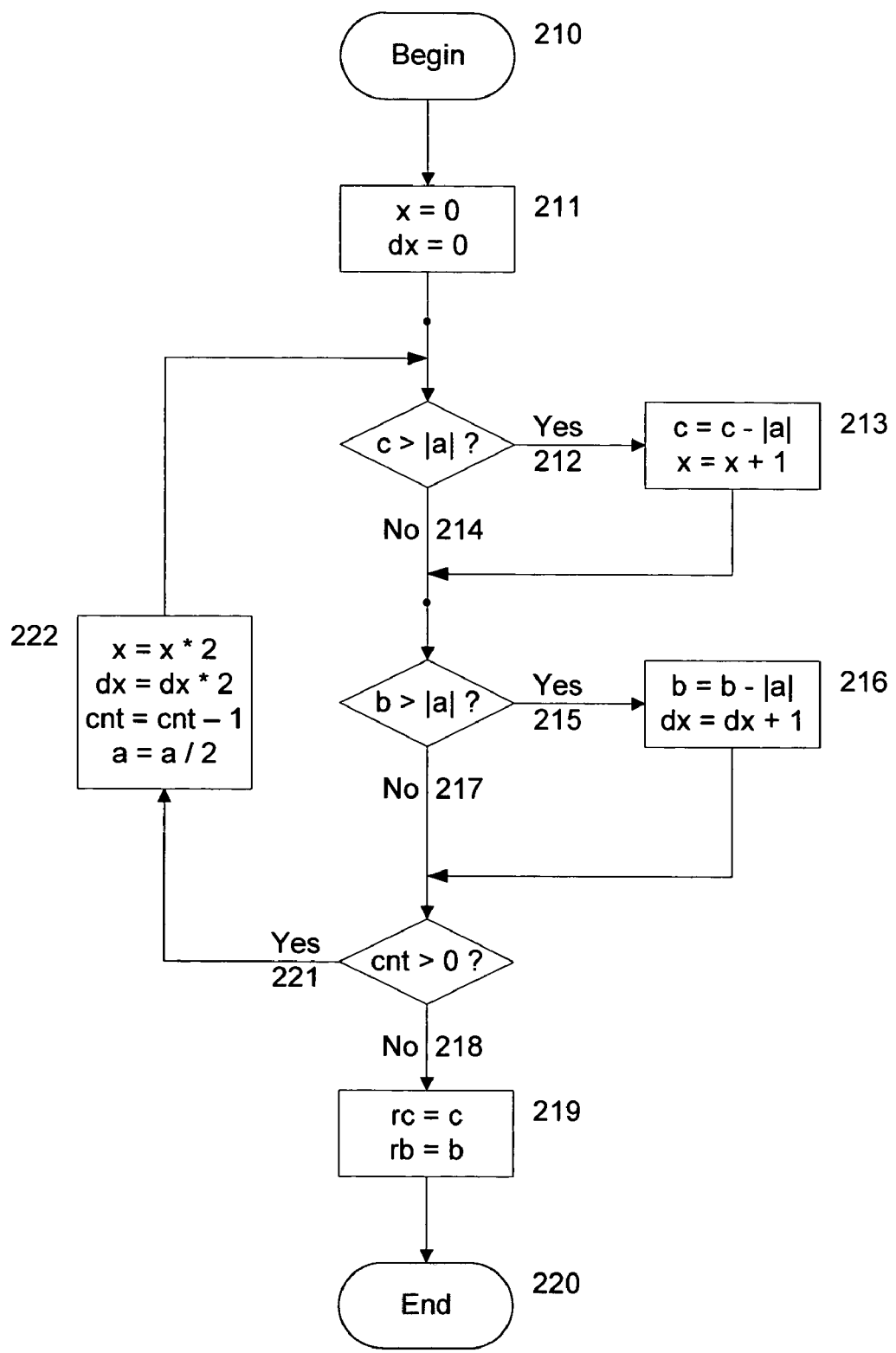
FIG. 5 is a flow diagram illustrating the foregoing method for the Bresenham setup process, according to an embodiment of the present invention.

The values $e_0 = c_{m+1} = f(0, \tilde{y}_k) \bmod |a|$ and $r_0 = b_{m+1} = |b| \bmod |a|$ are used in the Bresenham walk (described below) for calculating the Bresenham error. The value $$x_0 = \text{floor}\left(\frac{f(0, \tilde{y}_k)}{-\tilde{a}}\right)$$

is the x value for the first span after the moving-down process. The value $$\Delta x = \text{floor}\left(-\frac{\tilde{b}}{\tilde{a}}\right)$$

is the span-to-span x-increment value. FIG. 5 is a flow diagram illustrating the foregoing method for the Bresenham setup process, according to an embodiment of the present invention.

Bresenham Walk

The Bresenham walk is the process following the moving-down and Bresenham setup processes. After the Bresenham setup we have $$\tilde{a} \cdot \tilde{x} + \tilde{b} \cdot \tilde{y} + \tilde{c} = 0 \quad (74)$$

wherein $$e_0 = f(0, \tilde{y}_k) \bmod |a| \quad (75)$$

$$x_0 = \text{floor}\left(\frac{f(0, \tilde{y}_k)}{-\tilde{a}}\right)$$

$$r_0 = |b| \bmod |a|$$

$$\Delta x = \text{floor}\left(-\frac{\tilde{b}}{\tilde{a}}\right)$$

and $$\tilde{a} \cdot \tilde{x}_n + \tilde{b} \cdot \tilde{y}_{n+k} + \tilde{c} = \tilde{a} \cdot \tilde{x}_n + \tilde{b} \cdot \tilde{y}_{n+k} + f(0, \tilde{y}_k) - \tilde{b} \cdot \tilde{y}_k = 0 \Leftrightarrow \quad (76)$$

$$\tilde{a} \cdot \tilde{x}_n + \tilde{b} \cdot \tilde{y}_n + f(0, \tilde{y}_k) = 0 \quad (77)$$

and we want to find $$\tilde{x}_n = -\frac{\tilde{b}}{\tilde{a}} \cdot \tilde{y}_n - \frac{f(0, \tilde{y}_k)}{\tilde{a}} \Leftrightarrow \quad (78)$$

$$\tilde{x}_n = \frac{f(0, \tilde{y}_0)}{|a|} + \frac{|b|}{|a|} \cdot \tilde{y}_n \Leftrightarrow$$

$$\tilde{x}_n = x_0 + \frac{e_0}{|a|} + \Delta x \cdot n + \frac{r_0}{|a|} \cdot n \Leftrightarrow$$

$$\tilde{x}_n = \tilde{x}_{n-1} + \Delta x + \frac{e_{n-1} + r_0}{|a|} \Rightarrow \quad , n = 1, 2, \ldots, h - y_k$$

$$\tilde{x}_n = \tilde{x}_{n-1} + \Delta x + \begin{cases} 0, & e_{n-1} + r_0 < |a| \\ 1, & e_{n-1} + r_0 \geq |a| \end{cases}$$

$$e_n = e_{n-1} + r_0 - \begin{cases} 0, & e_{n-1} + r_0 < |a| \\ |a|, & e_{n-1} + r_0 \geq |a| \end{cases}$$

wherein h represents a height of the bounding box and $y_k$ represents the value of the y coordinate at the Bresenham setup point. To simplify the hardware, the error value is decremented by |a| at the beginning of the Bresenham walk, after which $e_n$ can be compared to 0, with the comparison being simpler to implement in hardware. We also calculate $$r_1 = r_0 - |a|$$

$$\tilde{e}_0 = e_0 + r_0 - |a| \quad (79)$$

after which the Bresenham walk is more simply described as follows:

$$\tilde{x}_n = \tilde{x}_{n-1} + \Delta x + \begin{cases} 0, & \tilde{e}_{n-1} < 0 \\ 1, & \tilde{e}_{n-1} \geq 0 \end{cases} \quad (80)$$

$$\tilde{e}_n = \tilde{e}_{n-1} + \begin{cases} r_0, & \tilde{e}_{n-1} < 0 \\ r_1, & \tilde{e}_{n-1} \geq 0 \end{cases} \quad , n = 1, 2, \ldots, h - y_k$$

Figure 6:
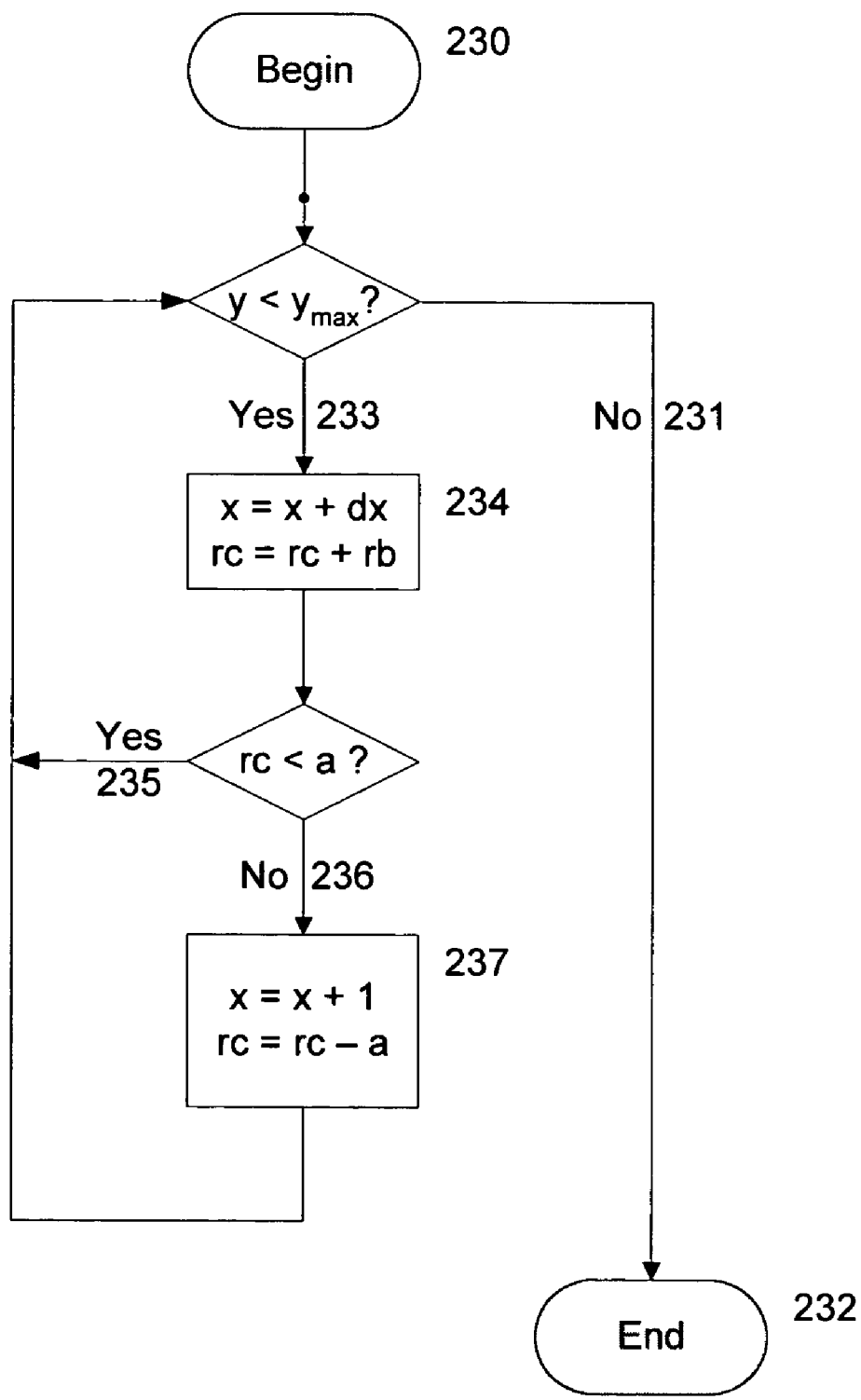
FIG. 6 is a flow diagram illustrating a method for the Bresenham walk process, according to an embodiment of the present invention.

FIG. 6 is a flow diagram illustrating a method for the Bresenham walk process, according to an embodiment of the present invention.

Span Generator Structure

Figure 7:
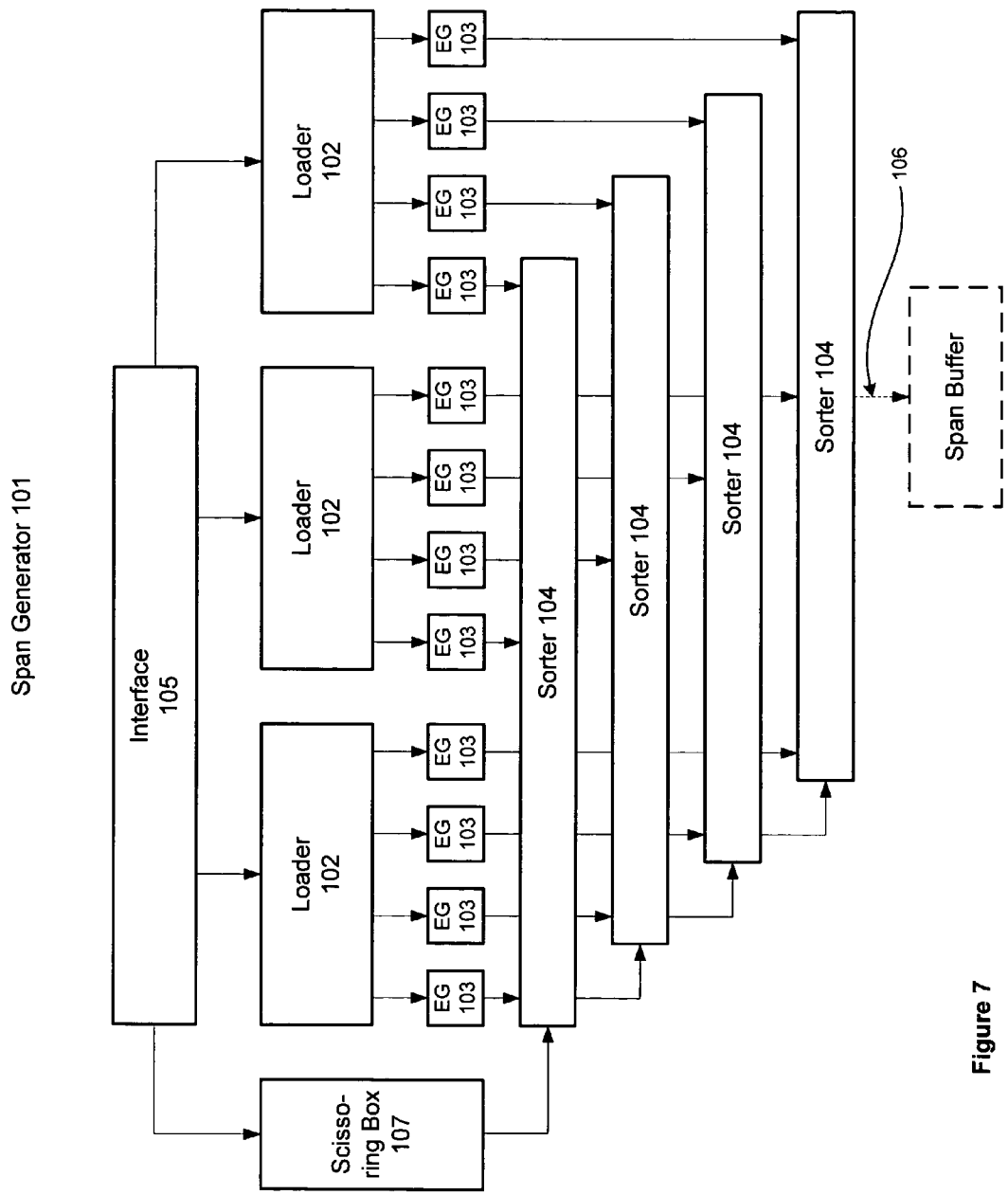
FIG. 7 is a block diagram illustrating a Span Generator, according to an embodiment of the present invention.

FIG. 7 is a block diagram illustrating the Span Generator 101, according to an embodiment of the present invention. The Span Generator 101 comprises
  An Input Interface 105
  3 Loaders 102
  12 Edge Generators 103
  4 cascaded 3-input Sorters 104
  An Output Interface 106
  A scissoring box module 107

Input Interface 105 packs input functionals for passing to the three Loaders 102. Loaders 102 perform Edge Generator 103 initialization. Edge Generators 103 generate "left" and "right" edges, which are then sorted in tournament Sorters 104. The Sorters' 104 output is directed via Output Interface 106 to a Tile Generator (TG), the TG for converting a set of spans into a sequence of tiles, wherein a tile refers to a rectangle set of pixels to be rendered.

Advantageously, the Span Generator 101 solves the following issues:
1. The Span Generator 101 produces spans for a triangle having up to 15 functionals. The X and Y clipping is performed by the scissoring box module 107, and thus 11 functionals remain. For reasons described in items 3 and 4, there are 12 Edge Generators 103 in the Span Generator 101 architecture.
2. The Span Generator 101 generates at least two spans per clock cycle, presenting a doubling of performance when compared to generating one span per clock cycle, for 30% more cost.
3. In the case of a reduced set of functionals (i.e. fewer than 7 or 8) the Span Generator 101 can generate more than two spans per clock cycle. In this case we use two Edge Generators 103 to process the same functional. The Loaders 102 setup the Edge Generators 103 at different spans according to the initial offsets of the respective Edge Generators 103. Analogously, in the case of fewer than 4 functionals, the span generation rate reaches eight spans per clock cycle.
4. The Loaders 102 provide the maximal Span Generator 101 performance for the most general case, which is a case involving 3 functionals. Thus the Span Generator 101 comprises 3 Loaders 102, wherein a Loader 102 can load four Edge Generators 103 sequentially.
5. For non-adaptive over-sampling with a rotating grid, the Span Generator 101 perform clipping by several half-planes with a known tangent, a process that can be done using a separate device.

External Assumptions of Data Formats

| | Range | Bits for representation | Comment |
|---|---|---|---|
| Window size, pixels | $[0 \ldots 2^{12} - 1] \times [0 \ldots 2^{12} - 1]$ | 12 | To be able to draw into 4096 × 4096 texture |
| Maximum divisions of oversampling grid per pixel | $2^2$ | 2 | Not the same as vertex subpixel grid, it is coarser. The functional coefficients will be given in the vertex subpixel grid while the x, y coordinates are in the oversampling one. |
| Window size, over-samples | $[0 \ldots 2^{14}] \times [0 \ldots 2^{14}]$ | 15 | Extreme window's pixels in rotated grid coordinates |
| Vertex X, Y after clipping, over-samples. | $[0 \ldots 2^{14} + 1] \times [0 \ldots 2^{14} + 1]$ | 15 | We need one more grid position on the right and bottom as otherwise the last column (raw) of pixels cannot be drawn (with tight clipping) because of open/close convention, hence a value of $2^{14} + 1$ is possible here |
| Subpixel vertex position, per pixel | $[0 \ldots 2^8 - 1]$ | 8 (subpixel bits) | Main grid for the triangle setup |
| Vertex X, Y after clipping, sub-pixels units. | $[0 \ldots 2^{20} + 1] \times [0 \ldots 2^{20} + 1]$ | 21 | We need one more grid position on the right and bottom as otherwise the last column (raw) of pixels cannot be drawn (with tight clipping) because of open/close convention, hence a value of $2^{20} + 1$ is possible here |

Internal Data Formats

| | Range | Bits for representation | Comment |
|---|---|---|---|
| Edge functional coefficients $a_i, b_i$, see below | $[-2^{20} - 1 \ldots 2^{20} + 1]$ | 21 + sign | See below |
| Edge functional coefficients (in a window coordinate system after setup) $c_i$ (see below) | $\pm(2^{40} + 2^{21} + 1)$ | 41 + sign | See below |
| Bounding box origin ($x_{min}, y_{min}$) in oversampling grid units | $[0 \ldots 2^{14}]$ | 15 | Bounding box origin is inclusive; it values the first x position to draw and the first span to draw (if span is not empty). The bounding box is defined as an original bounding box of a triangle intersected with the scissoring box. If no scissoring box exists, then the window box is used as a scissoring box. |
| Edge functional coefficients after shifting to the bounding box system $c_i$, see below | $\pm(2^{40} + 2^{35} + 2^{21} + 2^{15} + 1)$ | 41 + sign | |
| Bounding box maximum point ($x_{max}, y_{max}$) | $[0 \ldots 2^{14} + 1]$ | 15 | Bounding box max point is inclusive; it values the last x position to draw and the last span to draw (if span is not empty). |
| Non adjusted bounding box width $x_{max} - x_{min}$ | $[0 \ldots 2^{14} + 1]$ | 15 | The box with the width of 0 can have a single pixel column inside, since both sides of the box are inclusive. |
| Extended bounding box width $x_{max} - x_{min}$ rounded to the next power of 2 | $2^{[0 \ldots 15]}$ | 4 | Adjusted (extended) bounding box is used in the interpolator, since the width is to have a value of a power of two. Note: the extended box can be wider then the window. |

Input Interface

The Span Generator 101 has the following input interface:

| Field name | Length, bit | Description |
|---|---|---|
| L | 1 | The signal to start loading the first three functionals |
| M | 1 | Mode: 0 - standard, 1 - wire-frame |
| R | 8 | The width of the wire-frame line in the current grid units |
| F | 4 | The number of the functionals. In the case of the wire-frame mode, the three LSB are the mask for drawing the edges (0 indicates do not draw, 1 indicates draw), and MSB is a request to extent the bounding box by W/2 in all directions |
| A | 22 × 3 | The value of the a coefficients for the 11 functionals. 0 if the particular functional is not present |
| B | 22 × 3 | The value of the b coefficients for the 11 functionals. 0 if the particular functional is not present |
| C | 42 × 3 | The value of the c coefficients for the 11 functionals. 0 if the particular functional is not present |
| X0 | 15 | The start x value for the left edge of the scissoring box |
| X1 | 15 | The start x value for the right edge of the scissoring box |
| Y | 15 | The value of the y coordinate in the top corner of the scissoring box |
| Y0 | 15 | The value of the y coordinate in the left corner of the scissoring box |
| Y1 | 15 | The value of the y coordinate in the right corner of the scissoring box |
| Y2 | 15 | The value of the y coordinate in the bottom corner of the scissoring box |
| T | 2 | The tangent of the slope of the left edge of the scissoring box, according to the following:<br>00 The right edge is vertical<br>01 The tangent is 1<br>10 The tangent is 2<br>11 The tangent is 3 |
| XMIN | 15 | The value of the x coordinate for the left edge of the bounding box |
| XMAX | 15 | The value of the x coordinate for the right edge of the bounding box |
| YMIN | 15 | The value of the y coordinate for the top edge of the bounding box |
| YMAX | 15 | The value of the y coordinate for the bottom edge of the bounding box |

Wire-frame

We assume the wire-frame will be done as three functionals for edges inside the tight bounding and scissoring boxes. That means we do not support clipping planes for wire-frame. The span generation for the wire-frame mode does not take anything special besides the Loader 102 should supply corrected functional values for two nested triangles. The inner triangle is a set of points on the current grid, which should be excluded from the outer triangle. For an edge $f(x, y)=a \cdot x+b \cdot y+c$, the functional values for that two triangles will be $$f_1(x, y) = a \cdot x + b \cdot y + c + w/2 \text{ —outer edge}$$

$$f_2(x, y) = a \cdot x + b \cdot y + c - w/2 \text{ —inner edge}$$

where w is a width of the wireframe edges.

Loader

Figure 8:
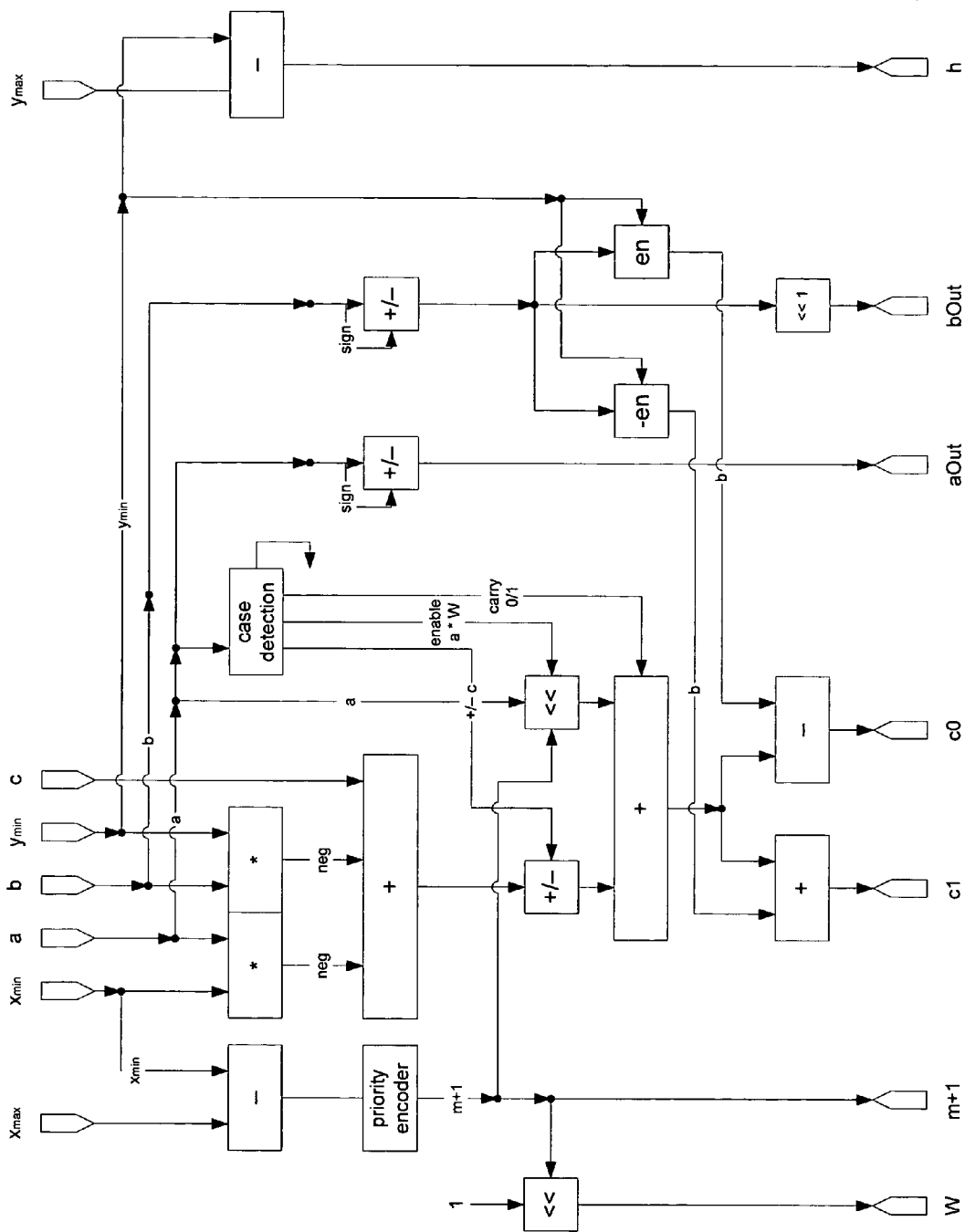
FIG. 8 is a block diagram illustrating a Loader (without shifters), according to an embodiment of the present invention.

FIG. 8 is a block diagram illustrating a Loader 102 (without shifters), according to an embodiment of the present invention. Loader 102 comprises the following inputs:

```
SHORT xMin, yMin, xMax, yMax, a, b;
LONG c;
```

```
SHORT nF;     // the number of the functionals
and outputs
SHORT c0l, c0h, c1l, c1h, bl, bh, al, ah, m;
BOOL dir, cor
```

Initially, a Loader 102 determines the global values, which are the same for all of the functionals in the polygon. To accomplish this, the Loader 102 computes the parameters of the bounding box:

```
SHORT w = xMax – xMin;
m = ceiling (log2 (w));
SHORT W = 1 << m;                    // 2**m
SHORT h = yMax – yMin;
SHORT k = (nF > 6)? 1 : (nF > 3);
SHORT aT, bT;                        // ã and b̃
```

Then for each functional the Loader 102 computes

```
nCase = (a < 0 && b >= 0)? 1 :
        (a <= 0 && b < 0)? 2 :
        (a > 0 && b <= 0)? 4 :
        (a >= 0 && b > 0)? 5 : 0;
                        // but the "0" is redundant
BOOL cor = (nCase > 3)? 1 : 0;
BOOL dir = (nCase < 2 || ncase > 4)? 0 : 1;
LONG cT2 = c – a * xMin – b * yMin;   // c
switch (nCase) {
    case 1:
        aT = a;
        bT = b;
        cT = cT2 – 1;                 // c̃
        break;
    case 2:
        aT = a;
        bT = –b;
        cT = –cT2 – a * W;
    case 4:
        aT = –a;
        bT = –b;
        cT = –cT2 – a;
    case 5:
        aT = –a;
        bT = –b;
        cT = cT2 + a * W;
}
```

The Loader 102 then computes two separate functional values for two sequential spans, and in the case of having k=1, 2, 4 Edge Generators 103 per functional, the Loader 102 also computes values for all other two or six sequential spans:

```
c [0] = cT – bT * (yMin % 2);
c [1] = c [0] + bT;
for (i = 1; i < k; i ++) {
    c [i * 2 ] = c [i * 2 – 2] + 2 * bT;
    c [i * 2 + 1] = c [i * 2 – 1] + 2 * bT;
}
bT <<= k;
```

Figure 9:
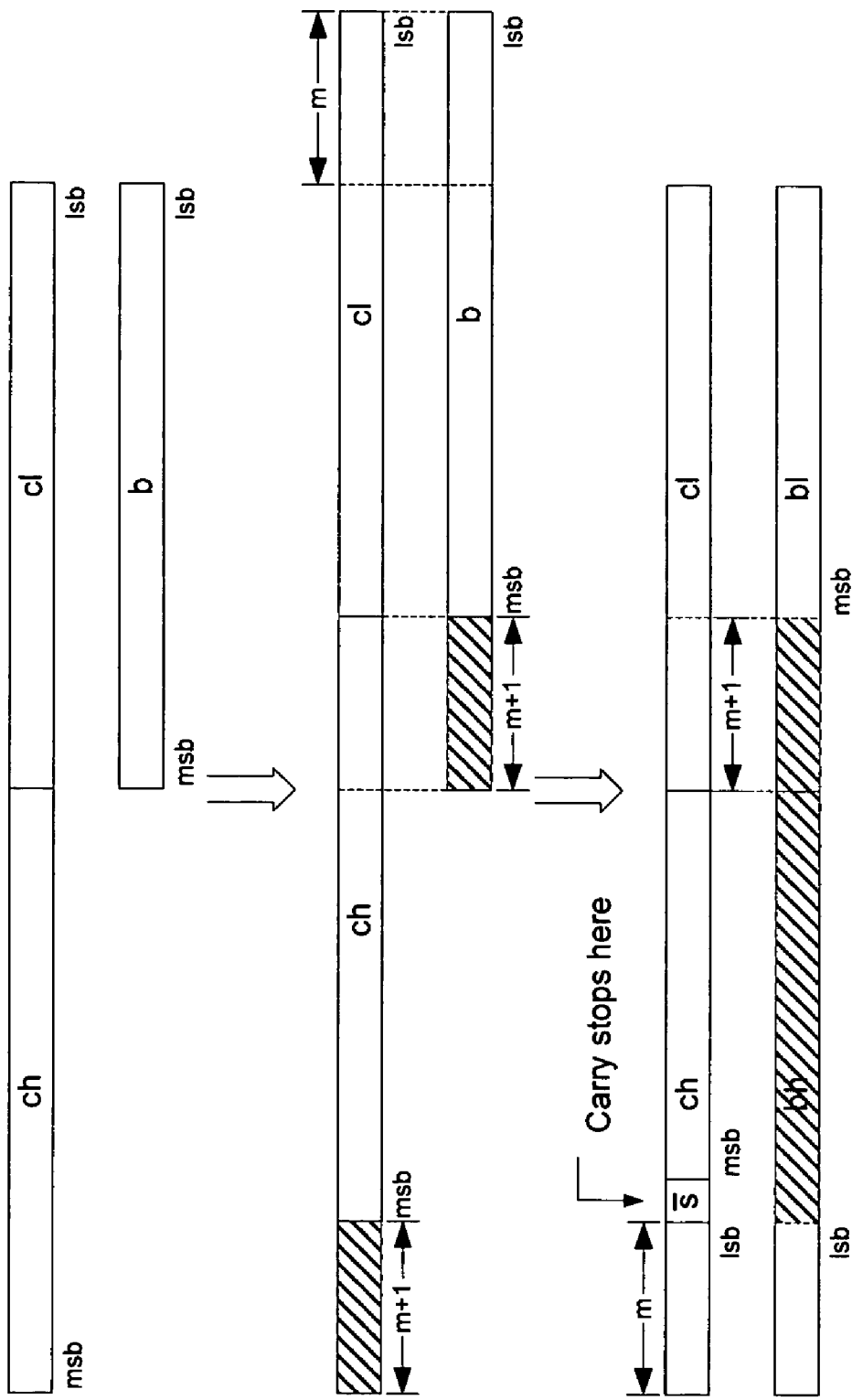
FIG. 9 is a block diagram illustrating $\tilde{b}$ and $\tilde{c}$ values wrapping before they are loaded into an Edge Generator, according to an embodiment of the present invention.

FIG. 9 is a block diagram illustrating b̃ and c̃ values wrapping before they are loaded into an Edge Generator 103, according to an embodiment of the present invention. The division algorithm is described above (see Special Case). But if it is performed literally then the ã value needs to be scaled before division multiplying it by $2^m$, which scales ã out of short range. Nevertheless each clock of division effective length of subtraction is still in the short range, thus instead of scaling the ã value, the $f(0, \tilde{y}_k)$ value is scaled by $2^{-m}$ before the division and then instead of dividing the scaled ã value by 2 each clock, the scaled $f(0, \tilde{y}_k)$ value is multiplied by 2. While a $$\Delta x = \text{floor}\left(-\frac{\tilde{b}}{\tilde{a}}\right)$$

value is also needed, the b̃ value is also pre-scaled. The scaled $f(0, \tilde{y}_k)$ value is longer than the non-scaled value. However, this does not necessitate a longer adder for performing the moving-down process: The least significant bits of the scaled $f(0, \tilde{y}_k)$ value are wrapped to the most significant bits (i.e. a cyclic rotation instead of an arithmetical shift), resulting in the scaled $f(0, \tilde{y}_k)$ value being expressed within the same bit-length as the non-scaled value. To avoid carry propagation from MSB to LSB, invert the sign bit before loading data into an Edge Generator 103. In the case of $f(0, \tilde{y}_k)<0$ this bit would be 0 and would not propagate a carry. To detect if $f(0, \tilde{y}_k)\geqq 0$, compare this bit to 1. The b̃ value is scaled in a similar way, with the difference that it is not wrapped.

At the first clock cycle of the division process, Edge Generator 103 determines whether one of the $f(0, \tilde{y}_k)$ or b̃ values exceed the boundaries, i.e. it determines whether the division result would be greater than or equal to W. For that purpose, the real scale factor is not m, but m+1. The division works in the above-described way, but if the result is not below W, either $x_0$ will be beyond the bounding box limit or the result after the first Bresenham step would be beyond the bounding box limit.

The Loader 102 loads the Edge Generators 103 sequentially, starting from the first three functionals of each triangle, with the first functional loaded into the first Edge Generator 103, and so on. If there are only three functionals, the Loader 102 loads other Edge Generators 103 with the functional values for other three groups of spans on the next sequential clock cycles.

Considering the input interface and the approach of loading several Edge Generators 103 at subsequent clock cycles, the pseudo-code for the Loader 102 is as follows:

```
template <int N>
void Loader<N> ( //pipelined, performed each clock
                // input interface:
    bool L, // the first clock of loading the L = 1
    bool M, // M = 1 in the wire-frame mode
    BIT2 Os,// oversampling grid to pixel grid relation:
                // 0 – 4x, 1 – 2x, 2 – 1x
    BIT8 R, // the width of a wire-frame line
    BIT4 F, // the number of functionals, edge mask in wire-
frame mode
    SHORT A, // the first coefficient
    SHORT B, // the second coefficient
    LONG C, // the free member
    BIT21 XMIN,   // the left edge of the bounding box
    BIT21 YMIN,   // the top edge of the bounding box
    BIT21 XMAX,   // the right edge of the bounding box
    BIT21 YMAX,   // the bottom edge of the bounding box
    BIT21 XFUN,   // the X coordinate of the zero functional
point
    BIT21 YFUN // the Y coordinate of the zero functional
point
    ) {
```

```
    BIT3 toGo = (L)? 4 : toGo – 1;       // counts the
number of
                                         // functionals to
load
    BIT3 nClk = (L)? 0 : nClk + (toGo != 0);   // counts
loading
                                         // clocks
    if (L) {
      bool wf = M,
      BIT8 wW = R,
      BIT15 xMIN = ((xMIN >> 5)
      BIT4 nFunct = F,
      BIT2 k = (wf)? 2 : (nFunct < 4)? 4 : (nFunct < 7)? 2 :
1;
      BIT21 w = XMAX – XMIN;
      BIT21 h = YMAX – YMIN;
      BIT4 m = ceiling (log2 (w));
      BIT16 W = 1 << m;                  // 2**m
      BIT15 xMin = XMIN;
      BIT15 yMin = YMIN;
    }
    BIT3 nCase =
      (A < 0 && B >= 0)? 1 :
      (A <= 0 && B < 0)? 2 :
      (A > 0 && B <= 0)? 4 :
      (A >= 0 && B > 0)? 5 :
      0; // redundant, not used
    BOOL cor = nCase > 3;
    BOOL dir = nCase >= 2 && nCase < 5;
    SHORT aT = (A >= 0)? –A : A;         // ã
    SHORT b2T = (B < 0)? –B : B;         // b̃
    LONG cT2 = C –                        // c̃
      A * (xMin – XFUN) –
      B * ((yMin & –(k << 1) – YFUN);    // align spans by Y
    cT2 >>= (6 + Os);                    // shift to
get
    LONG CT = ((dir)? –cT2 : cT2)        // c̃
      + (nCase == 1 || nCase == 4)? –1 :
      (dir)? –A << m : A << m;
    LONG c [8];
    LONG b [4];
    c [7] = c [5] + (b2T << 1);          // pipelining
    c [6] = c [4] + (b2T << 1);
    c [5] = c [3] + (b2T << 1);
    c [4] = c [2] + (b2T << 1);
    c [3] = c [1] + (b2T << 1);
    c [2] = c [0] + (b2T << 1);
    c [0] = cT – (yMin & 1)? b2T : 0;
    c [1] = c [0] + b2T;
    SHORT bT = b2T << (1 << k);          // << 2, 4, 8
```

Edge Generator

Figure 10A:
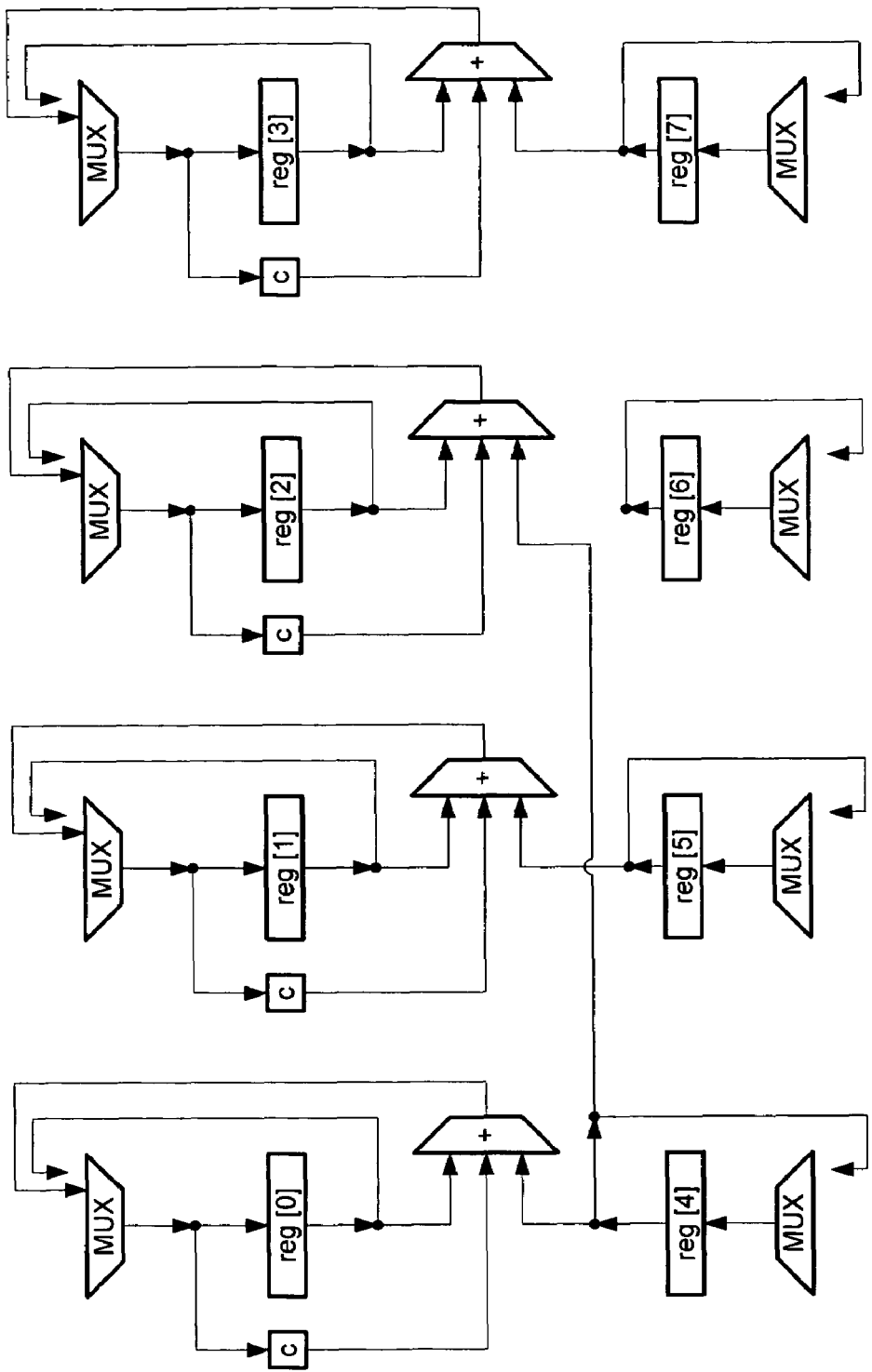
FIG. 10a is a block diagram illustrating an Edge Generator, according to an embodiment of the present invention.

FIG. 10*a* is a block diagram illustrating an Edge Generator, according to an embodiment of the present invention. The Edge Generator 103 comprises four 24-bit adders and eight 24-bit registers. An adder has the outputs of two registers as inputs, wherein the inputs of the registers are multiplexed:

```
    SHORT reg [8];
    bool carry [4];
    SHORT add [4];
    add [0] = req [0] + reg [4] + carry [0];
    add [1] = reg [1] + reg [5] + carry [1];
    add [2] = reg [2] + reg [4] + carry [2];
    add [3] = reg [3] + reg [7] + carry [3];
    for (i = 0; i < 8; i ++)
      reg [i] = some_function (add [k], reg [k], ...);
```

The registers' outputs are supplied directly to inputs of adders to minimize a delay at the adders. The structure of multiplexers allows us to minimize a delay at them also, the maximal post-adder delay supposed to be not more than 3×1 multiplexer.

Besides the implementation of the general functionality, the multiplexers are also performing loading and stalling operations by writing a new set of data or a previous state of an Edge Generator 103 back to registers.

The basic functionality of an Edge Generator 103 comprises three main phases: moving-down, Bresenham setup and Bresenham walk. There are also seven interim states, which are: load, stall, first clock of moving down, transfer from moving down to Bresenham setup, two different clocks of transfer from Bresenham setup to Bresenham walk and finally first clock of the Bresenham.

An Edge Generator 103 has the following inputs:

```
SHORT c0l, c0h, c1l, c1h, bl, bh, al, ah, m;
BOOL dir, cor, load, stall;
```

When the load signal is set, the Edge Generator 103 stores the input values in internal registers and resets its state. When the stall signal is set, the Edge Generator 103 registers retain their content for the current clock cycle.

Edge Generator: Moving Down

Figure 10B:
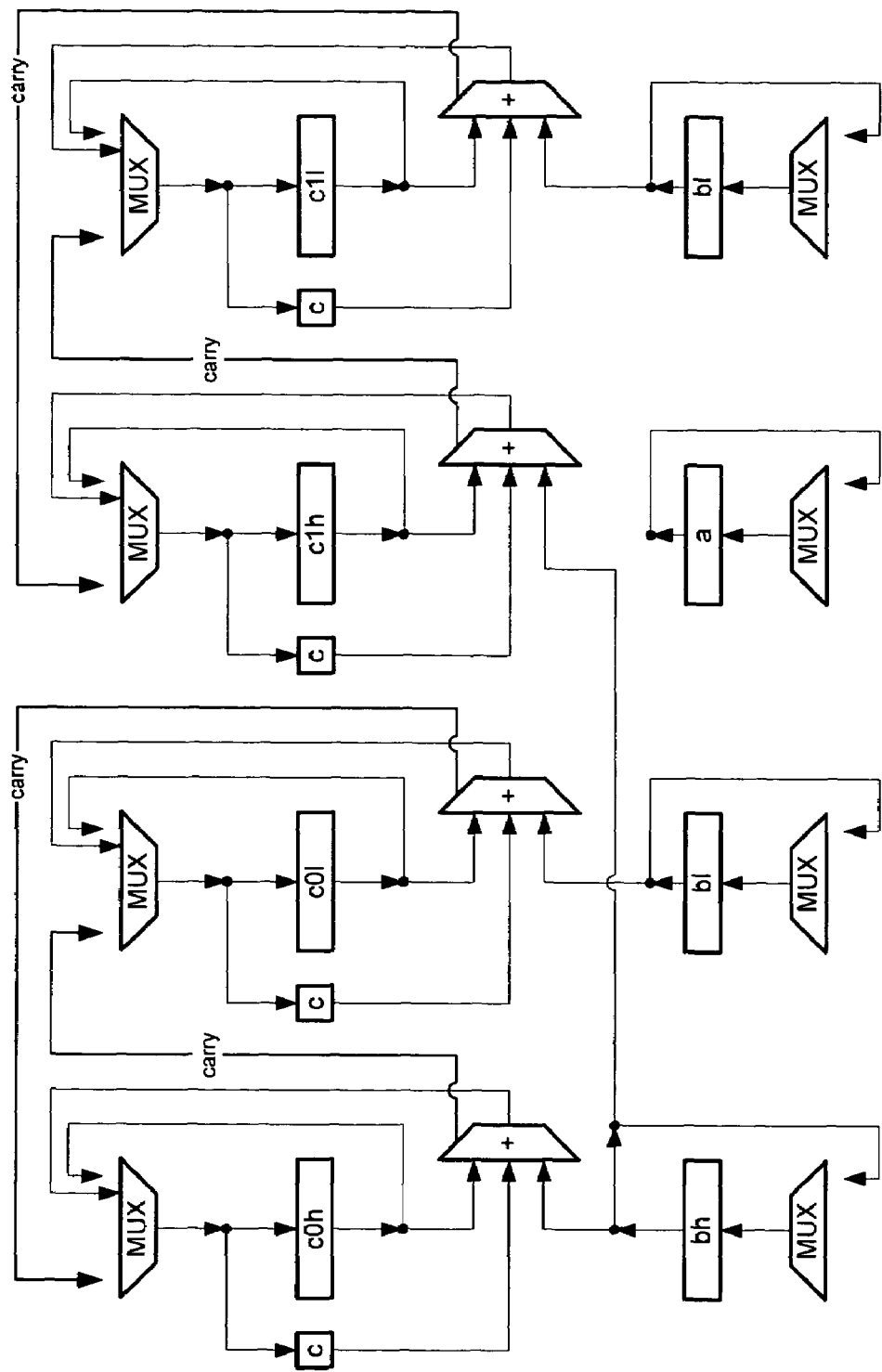
FIG. 10b is a block diagram illustrating an Edge Generator during the moving-down phase, according to an embodiment of the present invention.

FIG. 10b is a block diagram illustrating an Edge Generator 103 during the moving-down phase, according to an embodiment of the present invention. The functional value is accumulated in the register, which was loaded with the value of $\tilde{c}$ at the start. At this phase each Edge Generator 103 performs the following:

```
while (c < 0) {
    c = c + b;
}
```

Applying this to the hardware, we obtain:

```
// at loading stage
SHORT    mm       = bitlength (SHORT) – logm – 1;
SHORT    mask_b   = 1 << mm;
SHORT    mask_a   = mask_b – 1;
SHORT    mask_o   = –1 << (mm – 1);
SHORT    clock    = 0, repeat = 1;;
bool pl, ph, rl = 0, rh = 0;
while (repeat) {
    pl = rl
    ph = rh;
    if (clock == 0) {
        clock = 1;
        if (ch & mask_b) {
            repeat = 0;
            continue;
        }
        rl = carry (cl + bl + ph);
        cl += bl;
    }
    else {
        rl = carry (cl + bl + ph);
        cl += bl + ph;
        if ((ch & mask_a | masK_o) == –1 && rl)    {
            repeat = 0;
            continue;
        }
        rh = carry (ch + bh + pl);
        ch += bh + pl;
    }
}
```

The masks are for preliminary zero crossing detection, and their use allows avoiding "backing-down" the functional value, since the data is not written back to ch and the LSBs of ch remain intact. The masks also allow detection of a zero crossing one clock cycle earlier.

Setup

Figure 10C:
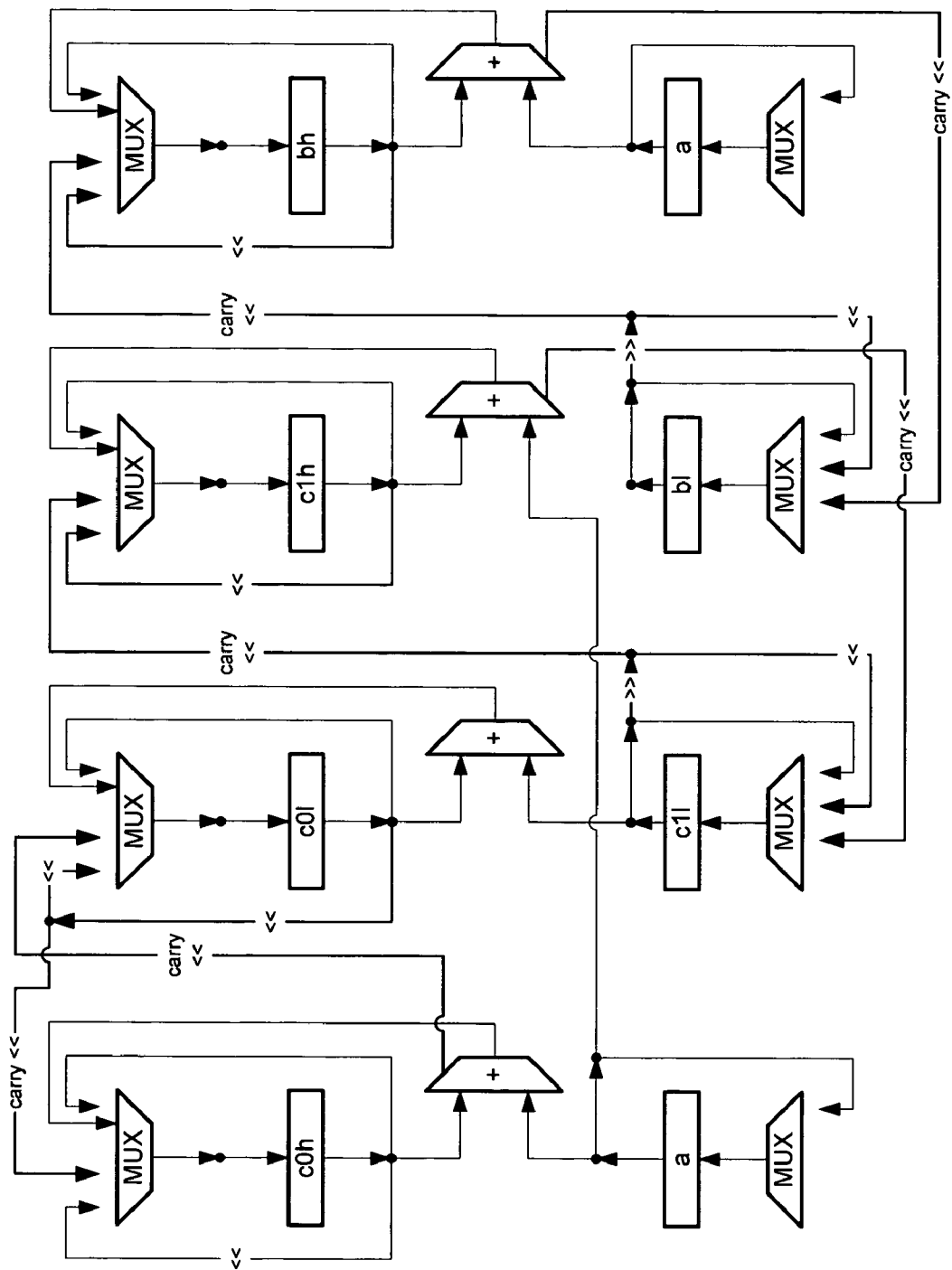
FIG. 10c is a block diagram illustrating an Edge Generator during the Bresenham setup phase, according to an embodiment of the present invention.

FIG. 10c is a block diagram illustrating an Edge Generator during the Bresenham setup phase, according to an embodiment of the present invention. The division algorithm was described above under "Special Case", and is implemented as follows:

```
// after moving down
setup:
ch &= ~ (mask_a | mask_b);
// setup
while (m != 0) {
    BOOL c0l_c = carry (c0l + a);
    if (!c0l_c) c0l += a;
    c0l <<= 1;
    c0l |= carry (c0h << 1);
    c0h <<= 1;
    c0h |= !c0l_c;
    BOOL c1l_c = carry (c1l + a);
    if (!c1l_c) c1l += a;
    c1l <<= 1;
    c1l |= carry (c1h << 1);
    c1h <<= 1;
    c1h |= !c1l_c;
    BOOL bl_c = carry (bl + a);
    if (!c0l_c) c0l += a;
    bl <<= 1;
    bl |= carry (bh << 1);
    bh <<= 1;
    bh |= !bl_c;
    m = m – 1;
}
```

Bresenham Walk

After the Bresenham setup process completes, the four values ch, cl, bh and bl are produced, indicating the Bresenham error, $x_0$, positive correction value and $\Delta x$, respectively. To perform edge generation we also need a negative correction value $r_1$. The Loader 102 sets the Boolean variables dir and cor. Setting the variable dir to 1 indicates that the Edge Generator 103 subtracts the x value from W. Setting the cor variable to 1 indicates that the Edge Generator 103 adds 1 to the x value. If the x value overflows, an appropriate flag is set depending on the value of the dir variable.

```
// after setup
SHORT    fm = (1 << m) – 1;         // negation mask = W – 1
SHORT    nm = (dir)? fm : 0;        // negate if dir == 1
SHORT    om = ~fm;                  // overflow mask to detect x < 0 or x >= W
#define er ch
#define x0 cl
#define r0 bh
#define r1 a
#define dx bl
x0 = (nm ^ x0) + cor;  // x0 = W – 1 – x0 + cor
if (dir)
    dx = ~dx;
r1 = a + b;            // a is negative, so r1 = |b| – |a|
// er = er + a;        // but we perform it later at first clock of
//                     // Bresenham
// at this point some values are moving to different registers
```

```
// according to general structure of the EG
// first clock
SHORT   clock = 0;
BOOL uf = false, ov = false;
while (1) {
    if (x0 & om)
        if (dir)   uf = true;           // x0 must be negative
        else       ov = true;   //      x0 must be >= W
    if (uf || ov)   continue;//         do not update registers
    if (clock == 0)   {
        clock = 1;
        x0 += dx + dir;
        er += r1;
    }
    else {
        x0 += dx + (er >= 0)? 1 – dir : dir;
        er += (er >= 0)? r1 : r0;
    }
}
```

Divider-by-3

For the Scissoring Box, a divider-by-3 is used to multiply the y offset by ⅓. A pseudo-code for a 15-bit divider-by-3 is as follows:

```
#define bit(a,n,m) ((a >> n) & ((1 << (m – n + 1)) – 1))
    // not correct in terms of the ANSI C, but works in our case
#define bitrev(a) (((a & 2) >> 1) | ((a & 1) << 1))
#define simp(a,b,c,d)   ((~d & ~c & b | c & a | d & ~b & ~a) & 1)
    // single-bit operation
#define remh(a,b) simp (a, a >> 1, b, b >> 1)
#define reml(a,b) simp (a >> 1, a, b >> 1, b)
#define rems(a,b) ((remh (a, b) << 1) | reml (a, b))
#define sim1(a,b,c) ((~c & b | c & ~b & ~a) & 1)
    // single-bit operation
#define sim2(a,b,c) ((~c & a | c & b       ) & 1)
    // single-bit operation
#define remc(a,b) sim1 (a, a >> 1, b)
#define remd(a,b) sim2 (a, a >> 1, b)
#define reme(a,b) ((remc (a, b) << 1) | remd (a, b))
#define remf(a,b)   bitrev (reme (bitrev (a), b))
bit16   div (bit15 a) {
bit15   c = a & 0x2aaa, d = a & 0x1555;
    c = (c & ~(d << 1)) | (~(c >> 1) & d);      // canonise
bit1
    a14 = bit (a, 14, 14),
    a13 = bit (a, 13, 13),
    a11 = bit (a, 11, 11),
    a09 = bit (a,  9,  9),
    a07 = bit (a,  7,  7),
    a05 = bit (a,  5,  5),
    a03 = bit (a,  3,  3),
    a01 = bit (a,  1,  1);
bit2   part0 [ 7 ] = {
    bit (c,  0,  1), //bits 00, 01
    bit (c,  2,  3), //bits 02, 03
    bit (c,  4,  5), //bits 04, 05
    bit (c,  6,  7), //bits 06, 07
    bit (c,  8,  9), //bits 08, 09
    bit (c, 10, 11), //bits 10, 11
    bit (c, 12, 13) //bits 12, 13
    },
bit2   part1 [ 8 ] = {
    rems (part0 [ 1], part0 [ 0]),
    reme (part0 [ 1], a01       ),
    rems (part0 [ 3], part0 [ 2]),
    reme (part0 [ 3], a05       ),
    rems (part0 [ 5], part0 [ 4]),
    reme (part0 [ 5], a09       ),
    remf (part0 [ 6], a14       ),
    a13 & ~a14
    },
bit2 part2 [ 8 ] = {
    rems   (part1 [ 2], part1 [ 0]),
    rems   (part1 [ 2], part1 [ 1]),
    rems   (part1 [ 2], part0 [ 1]),
    reme   (part1 [ 2], a03       ),
    rems   (part1 [ 6], part1 [ 4]),
    remh   (part1 [ 6], part1 [ 5]),
    reml   (part1 [ 6], part0 [ 5]),
    remc   (part1 [ 6], all       )
    },
bit2 part3 [8] = {
    rems   (part2 [ 4], part2 [ 0]),
    remh   (part2 [ 4], part2 [ 1]),
    reml   (part2 [ 4], part2 [ 2]),
    remh   (part2 [ 4], part2 [ 3]),
    reml   (part2 [ 4], part1 [ 2]),
    remh   (part2 [ 4], part1 [ 3]),
    reml   (part2 [ 4], part0 [ 3]),
    remc   (part2 [ 4], a07       )
    };
bit14   m = bit (a, 0, 13) ^ (
    ((part3 [ 0] & 1) <<  0) |
    ((part3 [ 1] & 1) <<  1) |
    ((part3 [ 2] & 1) <<  2) |
    ((part3 [ 3] & 1) <<  3) |
    ((part3 [ 4] & 1) <<  4) |
    ((part3 [ 5] & 1) <<  5) |
    ((part3 [ 6] & 1) <<  6) |
    ((part3 [ 7] & 1) <<  7) |
    ((part2 [ 4] & 1) <<  8) |
    ((part2 [ 5] & 1) <<  9) |
    ((part2 [ 6] & 1) << 10) |
    ((part2 [ 7] & 1) << 11) |
    ((part1 [ 6] & 1) << 12) |
    ((part1 [ 7] & 1) << 13));
    return (m << 2) | part3 [0]; // pack the reminder together
}
```

Scissoring Box and Synchronization

Figure 11A:
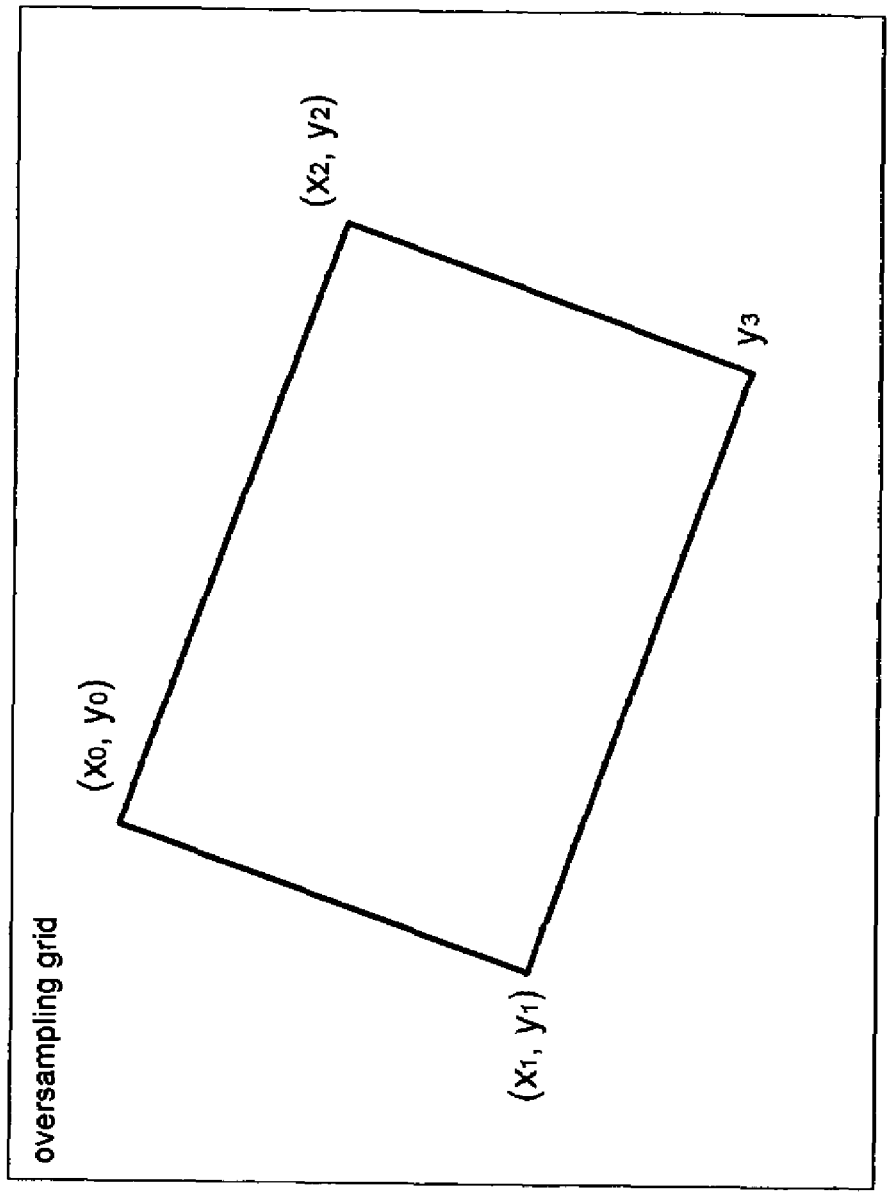
FIG. 11a is a block diagram illustrating a Scissoring Box origin, according to an embodiment of the present invention.

FIG. 11a is a block diagram illustrating a Scissoring Box origin, according to an embodiment of the present invention. The Span Generator 101 comprises a Scissoring Box module 107 for providing scissoring by a view-port, rotated relative to the x and y axes by an angle with tangent 0, 1, ½ and ⅓ (hereinafter also referred to as tangent 0, 1, 2, 3, respectively). The vertical coordinate $y_0$ of the upper-left corner of the rotated Scissoring Box is 0, and the horizontal coordinate $x_1$ of the lower-left corner is also 0. Optionally, the Scissoring Box can be used in an optional embodiment of the present invention having an over-sampling scheme.

The Scissoring Box has its origin specified by four points. The coordinates of the points are calculated by the driver (i.e. the software controlling the graphics chip) and stored in registers. The y coordinate of the upper corner is $y_0=0$. The Scissoring Box device performs calculation of the initial Scissoring Box coordinates for the first span. After that, the Scissoring Box device calculates up to eight Scissoring Box coordinates per clock cycle for current spans.

Figure 11B:
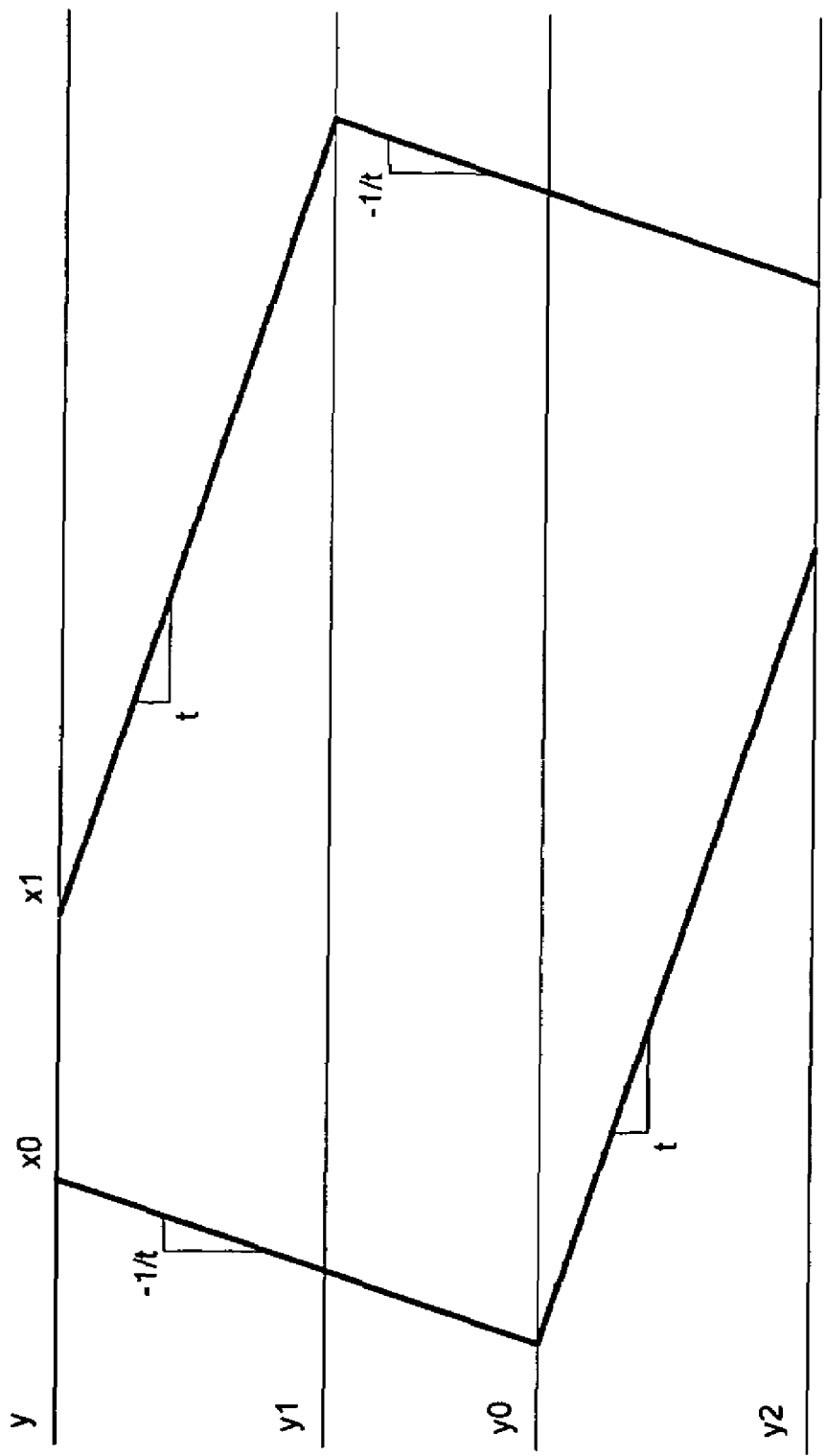
FIG. 11b is a block diagram illustrating a Scissoring Box, according to an embodiment of the present invention.

FIG. 11b is a block diagram illustrating a Scissoring Box, according to an embodiment of the present invention. The device to draw the Scissoring Box generates spans between two edges of the Scissoring Box. Two parts of the Scissoring Box generate both edges using the information about starting values of x and y coordinates, y coordinates of corners and rotation angle tangent:

```
void ScissoringBox (
    SHORT   x0,    //starting left x
    SHORT   x1,    //starting       right x
    SHORT   y,     //starting y (Ymin)
    SHORT   y0,    //y coordinate for left corner
    SHORT   y1,    //y coordinate for right corner
    SHORT   y2,    //ending y (Ymax)
    char t){ //2-bit tangent expression
        char cnt0 = t, cnt1 = t;
        while (y < y2) {
            bool m0 = y >= y0;
            x0   += (t)? ((m0)? t : (cnt0)? 0 : -1) : 0;
            cnt0 = (m0)? t : (cnt0)? cnt0 - 1 : cnt0;
            bool m1 = y < y1;
            x1   += (t)? ((m1)? t : (cnt1)? 0 : -1) : 0;
            cnt1 = (m1)? t : (cnt1)? cnt1 - 1 : cnt1;
        }
    }
```

The pair of the coordinates $x_0$, $x_1$ is then sorted among the edge coordinates by Edge Generator 103.

Sorter

As illustrated in FIG. 7, a Sorter 104 is a four-input tree compare/multiplex hardware device, three inputs of which are coupled to outputs of three Edge Generators 103 operating within the same clock cycle, and one input of which is coupled to an output of the Sorter 104 operating in the previous clock cycle. In an embodiment comprising four groups of Edge Generators 103 there are four Sorters 104. Each Edge Generator 103 delivers the direction of a half-plane (left or right) as a tag for the x coordinate value. A Sorter 104 compares x values for edges of different types separately.

```
typedef struct    { //the output of an EG
    int x,        //the position
    bool uf, ov;  //beyond the bounding box
    bool dir;     //left (0) or right (1)
} edge_out;
class temp_span {
public:
    int x0, x1; //left and right
    bool uf0, ov0;// left beyond the bounding box
    bool uf1, ov1;// right beyond the bounding box
    temp_span ( ) :
        x0 = 0, x1 = 0,
        uf0 = false, ov0 = false,
        uf1 = false, ov1 = false { };
    temp_span (edge_out ed) : temp_span ( ) {
        if (ed. dir){// if the edge is right, then it is the maximal x
            x1 = ed. x;
            uf1 = ed. uf;
            ov1 = ed. ov;
        }
        else         {// if the edge is left , then it is the minimal x
            x0 = ed. x;
            uf0 = ed. uf;
            ov0 = ed. ov;
        }
    };
};
temp_span sort_two (
    temp_span s0,
    temp_span s1
) {
    temp_span result;
    bool x0m = s0. uf0 || s1. ov0 || // compare flags
        (!s1. uf0 && !s0. ov0 && s0. x0 < s1. x0); // and values
    bool x1m = s0. ov1 || s1. uf1 ||
        (!s1. ov1 && !s0. uf1 && s0. x1 >= s1. x1);
    result. x0 = (x0m)? s1. x0 : s0. x0; // max of left
    result. uf0 = (x0m)? s1. uf0 : s0. uf0;
    result. ov0 = (x0m)? s1. ov0 : s0. ov0;
    result. x1 = (x1m)? s1. x1 : s0. x1; // min of right
    result. uf1 = (x1m)? s1. uf1 : s0. uf1;
    result. ov1 = (x1m)? s1. ov1 : s0. ov1;
    return result;
}
temp_span sorter {
    temp_span s0,  //The output of the previous Sorter
    edge_out    x1,   //The first EG output
    edge_out    x2,   //The second EG output
    edge_out    x3    //The third EG output
) {
    temp_span s1 (x1), s2 (x2), s3 (x3);
    return sort_two (
        sort_two (s0, s1),
        sort_two (s2, s3)
        );
}
```

Span Buffer Interface

The Span Buffer interface (also known as the Output Interface 106 shown in FIG. 7) converts the last Sorter output to absolute coordinates (note that the values are bounding box relative from the Loaders 102 through the Sorters 104) and packs them into the Span Buffer.

At this point of the span generation process, the computed values comprise the output of the last Sorter s3 and the bypassed outputs of the three other Sorters s0, s1 and s2. Also available are the current y coordinate, the $x_{min}$ and $X_{max}$ parameters of the bounding box, and k=1, 2, 4 representing the number of Edge Generators 103 computing spans for the same functional. Also note that the Sorters 104 are doubled, since at the lowest rate there are two spans generated per clock cycle, and therefore two spans are processed per clock cycle in parallel.

```
bool wf;           //wire-frame mode wf == true
bool update = true; //when a new triangle starts SB should get new y
SHORT   xMax, xMin;
SHORT   y;          //from the current y counter
SHORT   w = xMax – xMin;        // The real bounding box size
typedef struct {
    x0, x1;    // the values –1 and –2 are reserved for
               // uf and ov accordingly.
} span;
SHORT   sb_cnt = 0; //the counter of position in SB row
span spare_buffer [16];
void WriteNextToSB (
    span sp, //span to write
    SHORT    pos, //position in the SB row
    bool next //next row
);
void move_sb_cnt ( ) {
    sb_cnt ++;
    if (sb_cnt >= 8) {
        Span_Buffer. Write (        // see TG doc for description
            spare_buffer,
            y & (0xfffffff0 || wf << 3),    // y is aligned
            update,   // update y if necessary
            wf,       // wire-frame
            update);
        update = false;
        sb_cnt = 0;
    }
}
```

-continued

```
void sb_interface (
    temp_span s [8], //two first - from the first level
Sorter,
                    // two next - from second level, etc.
    SHORT    y,    //from the y counter
    SHORT    xmin, //from the input
    SHORT    xmax, //from the input
    SHORT    k    //from the input
) {
int j;
span sp [8];    //temporary spans
//actually the following is performed at Sorters outputs
for (j = 0; j < 8; j ++)        {
    sp [j]. x0 =
        (s [j]. ov0)? MAX_INT :
        (s [j]. uf0)? -1 :
        (s [j]. x0 > w)? MAX_INT : s [j]. x0 + xMin;
    sp [j]. x1 =
        (s [j]. ov1)? MAX_INT :
        (s [j]. uf1)? -1 :
        (s [j]. x1 > w)? MAX_INT : s [j]. x1 + xMin;
    }
    if (update) {
        sb_cnt = y & (wf)? 0x7 : 0xf;
        for (j = 0; j < 16)
            spare_buffer [j]. x0 = spare_buffer [j]. x1 = 0;
    }
    if (wf) {
        bool empty [4];    //empty flags for all 4 spans of the
                           // internal triangle
        for (j = 0; j < 4; j ++) {
            empty [j] =
                s [j + 4]. x0 == MAX_INT ||
                s [j + 4]. x1 == -1 ||
                s [j + 4]. x0 > s [j + 4]. x1;
            spare_buffer [sb_cnt + j ]. x0 = sp [j]. x0;
            if (empty [j]) {
                spare_buffer [sb_cnt + j ]. x1 = sp [j ]. x1;
                spare_buffer [sb_cnt + j + 8]. x0 = MAX_INT;
                spare_buffer [sb_cnt + j + 8]. x1 = -1;
            }
            else {
                spare_buffer [sb_cnt + j ]. x1 = sp [j + 4]. x0;
                spare_buffer [sb_cnt + j + 8]. x0 = sp [j + 4]. x1;
                spare_buffer [sb_cnt + j + 8]. x1 = sp [j ]. x1;
            }
            move_sb_cnt ( );
        }
        sb_cnt = (sb_cnt + 4);
        return;
    }
    for (j = (k - 1) * 2; j < k * 2; j ++) {
        if (k == 2 && j == 4)        // when k == 2 we use first and third
            j == 6;                  // sorters outputs
        spare_buffer [sb_cnt] = sp [j];
        move_sb_cnt ( );
    }
}
```

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. The pseudo-code fragments represent high-level implementation examples and are intended to illustrate one way of implementing functionalities described herein. Other variations and embodiments are possible in light of above teachings, and it is thus intended that the scope of invention not be limited by this Detailed Description, but rather by Claims following.

We claim:

1. A method for rasterization, comprising the steps of:
receiving a first set of coefficients representing a first functional and a bounding box offset; and
using a computer device for computing a second set of coefficients a, b and c representing a second functional f(x, y)=a·x+b·y+c, the second functional falling within a quadrant indicated by a<0 and b≧0;
wherein the computing step comprises scaling an intermediate value, the scaling comprising a cyclic bit-rotation of the intermediate value, whereby the intermediate value is represented within a first bit-length, a scaled version of the intermediate value is represented within a second bit-length, and the second bit-length does not exceed the first bit-length;
based on the second functional, computing edge values and generating spans using the edge values; and
rendering pixels based on the spans.

2. The method of claim 1, further comprising the step of passing from a first coordinate system to a second coordinate system, the first functional according to the first coordinate system and the second functional according to the second coordinate system.

3. The method of claim 2, wherein the first coordinate system corresponds to a main grid and the second coordinate system corresponds to an over-sampling grid.

4. A method for performing rasterization, comprising the steps of:
receiving a first set of coefficients and a bounding box offset for generating edge functions, wherein the first set of coefficients represents a first functional; and
using a computer device for computing a second set of coefficients a, b and c representing a second functional f(x, y)=a·x+b·y+c, wherein the first and second functionals represent a primitive, wherein the second functional falls within a quadrant indicated by a<0 and b≧0,and wherein the computing step comprises scaling an intermediate value prior to rendering pixels;
rendering pixels based on spans.

5. The method of claim 4, wherein the step of scaling an intermediate value comprises performing a cyclic bit-rotation of the intermediate value so that a longer adder is not required for performing a moving-down process.

6. The method of claim 5, wherein the intermediate value is represented within a first bit-length, wherein a scaled version of the intermediate value is represented within a second bit-length, and wherein the second bit-length does not exceed the first bit-length.

7. The method of claim 5, wherein the step of scaling further comprises inverting a sign bit of the intermediate value.

8. The method of claim 4, further comprising the step of passing from a first coordinate system to a second coordinate system, the first functional according to the first coordinate system and the second functional according to the second coordinate system.

9. The method of claim 4, further comprising based on the second set of coefficients, performing span generation for the functionals using a plurality of edge generators.

10. The method of claim 4, wherein the first coordinate system corresponds to a main grid and the second coordinate system corresponds to an over-sampling grid.

* * * * *